US011828869B2

(12) United States Patent
Dafesh

(10) Patent No.: US 11,828,869 B2
(45) Date of Patent: Nov. 28, 2023

(54) NARROWBAND ANTIJAM SIGNALING SYSTEM (NASS) AND DEVICE

(71) Applicant: The Aerospace Corporation, El Segundo, CA (US)

(72) Inventor: Philip A Dafesh, Manhattan Beach, CA (US)

(73) Assignee: THE AEROSPACE CORPORATION, El Segundo, CA (US)

( * ) Notice: Subject to any disclaimer, the term of this patent is extended or adjusted under 35 U.S.C. 154(b) by 82 days.

(21) Appl. No.: 16/911,315

(22) Filed: Jun. 24, 2020

(65) Prior Publication Data

US 2021/0011120 A1 Jan. 14, 2021

Related U.S. Application Data

(60) Provisional application No. 62/872,208, filed on Jul. 9, 2019.

(51) Int. Cl.
| | |
|---|---|
| *G01S 7/36* | (2006.01) |
| *G01S 7/02* | (2006.01) |
| *G06F 17/14* | (2006.01) |
| *H04K 3/00* | (2006.01) |
| *H04B 1/10* | (2006.01) |
| *G01S 13/76* | (2006.01) |

(52) U.S. Cl.
CPC ............... *G01S 7/36* (2013.01); *G01S 7/021* (2013.01); *G01S 13/76* (2013.01); *G06F 17/142* (2013.01); *H04B 1/1036* (2013.01); *H04K 3/42* (2013.01)

(58) Field of Classification Search
CPC . G01S 7/36; G01S 7/021; G01S 13/76; G06F 17/142; H04B 1/1036; H04K 3/42
See application file for complete search history.

(56) References Cited

U.S. PATENT DOCUMENTS

| | | | |
|---|---|---|---|
| 8,515,335 B2 | 8/2013 | Dafesh et al. | |
| 8,774,315 B2 | 7/2014 | Cahn et al. | |
| 9,197,282 B2 | 11/2015 | Cahn et al. | |
| 9,235,598 B2 | 1/2016 | Pfeifle | |
| 9,391,654 B2 | 7/2016 | Wyckoff et al. | |
| 9,654,158 B2 * | 5/2017 | Dafesh | H04B 1/7107 |
| 2004/0071200 A1 * | 4/2004 | Betz | G01S 19/30 375/E1.008 |
| 2004/0213333 A1 * | 10/2004 | Huang | H03M 3/40 375/150 |

(Continued)

OTHER PUBLICATIONS

Dafesh, et al., "Practical and Theoretical Tradeoffs of Active Parallel Correlator and Passive Matched Filter Acquisition Implementations", Proceedings of the IAIN World Congress and the 56th Annual Meeting of The Institute of Navigation, 2000.

*Primary Examiner* — Peter M Bythrow
*Assistant Examiner* — Nazra Nur Waheed
(74) *Attorney, Agent, or Firm* — LeonardPatel PC

(57) ABSTRACT

A narrowband AJ signaling system includes an AJ processor placed between a high precision analog-to-digital (ADC) converter and a narrowband digital receiver. In another example, the AJ processor is placed between the high precision ADC and a digital-to-analog converter (DAC). The AJ processor of either example may suppress the jammer power down to the level of the noise floor of the system.

20 Claims, 14 Drawing Sheets

(56) References Cited

U.S. PATENT DOCUMENTS

| | | | |
|---|---|---|---|
| 2006/0125688 A1* | 6/2006 | Henderson | G01S 19/21 |
| | | | 342/357.59 |
| 2009/0268788 A1* | 10/2009 | Simic | H04K 3/224 |
| | | | 375/150 |
| 2011/0051783 A1 | 3/2011 | Cahn et al. | |
| 2013/0183921 A1* | 7/2013 | Mu | H03D 7/18 |
| | | | 455/326 |
| 2018/0205412 A1* | 7/2018 | Lin | H04B 1/406 |

* cited by examiner

NARROWBAND ANTIJAM SIGNALING SYSTEM (NASS) AND DEVICE

CROSS-REFERENCE TO RELATED APPLICATION

This application claims the benefit of U.S. Provisional Application No. 62/872,208, filed on Jul. 9, 2019. The subject matter thereof is hereby incorporated herein by reference in its entirety.

FIELD

The present invention relates to signaling systems, and more particularly, to a narrowband antijam (AJ) signal system.

BACKGROUND

The Global Positioning system and other Global Navigation Satellites Systems (GNSS) transmit direct sequence spread spectrum (DSSS) signals that provide time of arrival and related information needed to compute ranging solutions. These signals have some inherent resistance to jamming that improves with the greater spread bandwidth of the signal. In the GPS, authorized signals have been designed to have wider bandwidths than their counterpart civilian signals so that the authorized signals have greater resistance to jamming. Jam resistant communication systems also use some of the same wide bandwidth spread spectrum signaling techniques, such as DSSS and frequency hopped spread spectrum (FHSS), to achieve greater resistance to jamming. Optionally, these systems may use other spread spectrum techniques known in the art to achieve greater resistance to jamming.

The reason for this is that according to conventional wisdom, spread spectrum communication and navigation systems are limited in their inherent AJ performance by spreading gain, which is proportional to the effective signal bandwidth. For example, the encrypted M and P(Y) code GPS signal occupies over 10 times the effective bandwidth of the civilian C/A code GPS signal, making C/A code inherently 10 times less resilient to jamming as P(Y) or M codes. See, for example, "Capt. Brian C. Barker, et., al, Overview of the GPS M code signal," Proceedings of the National Technical Meeting, January 2000 for illustration of the M code and P(Y) (also referred to as Y code) bandwidths relative to the C/A code signal's bandwidth. In another example, protected tactical communication also employs frequency hopping over very wide bandwidths to provide more inherent resistance to jamming than narrowband systems.

Wider bandwidth systems, however, are limited by available spectrum and the dynamic range of components. For example, wide-bandwidth analog-to-digital converters (ADCs) typically have much lower precision, effective number of bits (ENOB), than narrowband ADCs. Because of these limitations, the maximum tolerable jammer-to-signal (J/S) power ratio is limited by ADC precision and the achievable dynamic range of radio frequency components.

Moreover, the signal acquisition time in wideband GPS receivers, such as M code and P(Y) code receivers, is much longer than that of civilian GPS signals, such as the civilian course acquisition (C/A) code signal, because the signals do not repeat. For this reason, searching for the correct code phase in a reasonable time requires much more complex acquisition search engines. For example, the Time to First Fix (TTFF) of the wideband P(Y) and M code signals can be (>>60 seconds), which is much longer than in receivers designed for mass market consumer applications using the C/A code signal or other civilian GPS or GNSS signals. In general, the TTFF for civilian GNSS signals is typically much smaller than the TTFF of wideband signals designed for jam resistance.

Thus, alternative jam resistant signaling systems are needed, which may improve resistance to jamming, do not require additional spectrum, and reduce TTFF without relying on signal repetition used in the C/A code or other civilian GNSS signals such as L1C, L2C and GNSS signals from systems other than GPS.

SUMMARY

Certain embodiments of the present invention may provide solutions to the problems and needs in the art that have not yet been fully identified, appreciated, or solved by current wideband AJ signaling systems. For example, some embodiments may pertain to NASS, which uses lower rate signals and exploits a wide dynamic range radio frequency (RF) front end and high precision ADC technology.

In an embodiment, a narrowband AJ signaling system includes an AJ processor placed between a high precision analog-to-digital (ADC) converter and a narrowband digital receiver. In some other embodiments, the AJ processor is placed between the high precision ADC and a digital-to-analog converter (DAC). The AJ processor of either embodiment may suppress the jammer power down to a level based on the noise floor of the system.

In another embodiment, optimal longer coherent integration times are selected with NASS receivers to achieve improved Time to First Acquisition (TTFA) under jamming relative to wideband signal systems, even in the absence of AJ processing.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings.

DETAILED DESCRIPTION OF THE EMBODIMENTS

Some embodiments generally pertain to a narrowband AJ signaling system that includes an AJ processor placed between a high precision ADC converter and a narrowband digital receiver. In some other embodiments, the AJ processor is placed between the high precision ADC and a DAC. The AJ processor of either embodiment may suppress the jammer power down to the level of the noise floor of the system or any other appropriate level.

Figure 1:
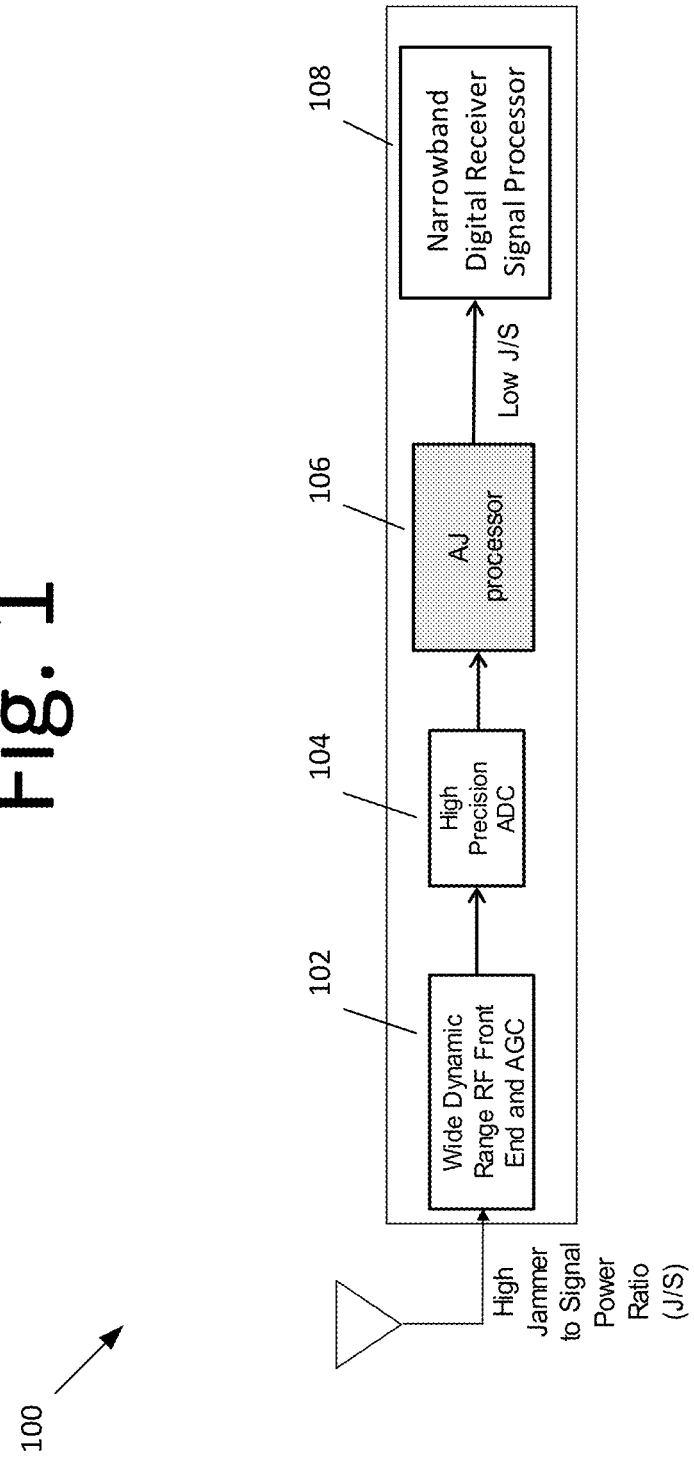
FIG. 1 is a block diagram illustrating an integrated narrowband signaling system, according to an embodiment of the present invention.

FIG. 1 is a block diagram illustrating an integrated narrowband signaling system 100 for NASS, according to an embodiment of the present invention. This embodiment is applied to the reception of narrowband GPS signals to provide greater overall jam resistance than current wideband GPS signals, while enabling shorter time to first fix (TTFF). In one embodiment, the signal bandwidth is typically limited to bandwidths that are at least 10 times narrower than conventional wideband AJ signaling systems. Alternate embodiments and variations may be applicable to other GNSSs and/or communication systems.

The integrated narrowband signaling system 100 includes a wide dynamic range RF front end and automatic gain control (AGC) module 102, a high precision ADC 104, AJ processor 106, and a narrowband digital receiver signal processor 108. In some embodiments, wide dynamic range RF front end and AGC module 102 includes a low noise amplifier (not shown) that amplifies RF signals, a band pass filter (not shown) that filters out unwanted RF spectrum, a RF downconverter (not shown) that downconverts RF signals to an intermediate frequency (IF) and an anti-aliasing filter (not shown) that filters out unwanted RF signals before the signals are digitized by the high precision ADC. Depending on the specific design, filters may also be employed in the wide dynamic range front end and AGC module 102. In some embodiments, the AGC module may also be omitted.

In other embodiments, the RF downconverter may be a quadrature downconverter that downconverts the in-phase (I) and quadrature (Q) channel signals, followed by an optional anti-aliasing filter that removes higher frequency components before digitization by high precision ADC 104. In some other embodiments, high precision ADC 104 may include two channels, one for digitizing one or more I channel signals and one for digitizing one or more Q channel signals. In some further embodiments, multiple RF front end and AGCs may be used in combination to receive signals from different antennas, as would be the case for a multi-element antenna receiver configuration. Many variations of the RF front end and AGC module 102 may also be employed such as a multi-stage RF front end employing one or more amplifiers, one or more mixers, one or more AGCs and one or more filters.

Thereafter, high precision ADC 104 provides 18 bits or more of precision and may provide 16 or more ENOB. High precision ADC 104 may include one channel for digitization at an IF or two channels for digitization of I and Q signals at baseband. In another embodiment, high precision ADC 104 contain more than two channels dependent on the number of RF front end and AGC stages.

Conventionally, military GPS navigation signals, such as the encrypted M-code and P(Y) code signals, typically offer 10 dB greater AJ performance than the repeating civilian C/A code civilian signal. This is since military GPS navigation signals typically have at least 10 times the bandwidth. In some embodiments, P(Y) and M-code receivers and AJ processors described herein constitute components of a wideband AJ signaling system. For example, in some embodiments, AJ processor 106 is integrated with the receiver electronics in a single unit as in the case of FIG. 1. In other embodiments, AJ processor 106 may be in a separate device (see FIG. 2), and is therefore, a modular configuration.

Regardless of the embodiment, AJ processor 106 may suppress the jammer power down to the level of the noise floor of the system. This suppression is typically achieved in one or more domains (e.g., time, frequency, amplitude, or spatial domains). Alternatively, other domains may also be used such as the wavelet transform domain. These techniques may include frequency domain excision, time domain excision, spatial nulling and/or beamforming using multi-element antennas or amplitude domain techniques. See, for example, U.S. Pat. Nos. 9,391,654 B2, 9,654,158 B2 and 9,923,598 B2.

After the signal is passed through wideband front end 102 and is digitalized using a high precision ADC 104, AJ processor 106 may operate on the signal to suppress the interference prior to further processing of the signal by narrowband digital receiver processor 108. In some embodiments, narrowband digital receiver 108 acquires the narrowband signal, performs code and carrier tracking, and demodulates data from the signal. In other embodiments, narrowband digital receiver signal processor 108 may also include circuitry (not shown) configured to convert the bit resolution from high precision (18 or more bits) to low precision (fewer than 18 bits) optimally reducing power consumption in the narrowband digital receiver signal processor 108. For example, when narrowband digital receiver signal processor 108 processes a GNSS navigation signal, narrowband digital receiver signal processor 108 uses between 1-6 bits to conserve power. This may be achieved by truncating or thresholding the high-resolution bit stream to convert the stream to a low resolution bit stream, for example.

The signal acquisition may utilize active parallel correlator or passive matched filter implementations. See, for example, P. A. Dafesh and J. K. Holmes, "Practical and Theoretical Tradeoffs of Active Parallel Correlator and Passive Matched Filter Acquisition Implementations", Proceedings of the IAIN World Congress and the 56th Annual Meeting of The Institute of Navigation, 2000.

In some embodiments, navigation data is obtained from the narrowband signal directly prior to the receiver computing a position fix. In other embodiments, navigation data is obtained over an alternative communication channel using assisted GPS techniques. The data may be conventional navigation data or may be long term orbital and clock information that enables the receiver to obtain a navigation fix over a period of up to 7 days or longer. In some embodiments, the receiver is a digital GPS navigation receiver. In other embodiments, the receiver is a digital GNSS navigation receiver. As such, the receiver computes its own position using satellite-based positioning techniques. The receiver may also compute pseudorange, pseudorange rate, and/or carrier phase measurements, which may also be used to compute a receiver's position along with other information such velocity and time information. This position computation may alternatively be performed in a server or on a cloud computer. In other embodiments, the receiver may be a communication receiver that demodulates data messages from a modulated narrowband signal.

Figure 2:
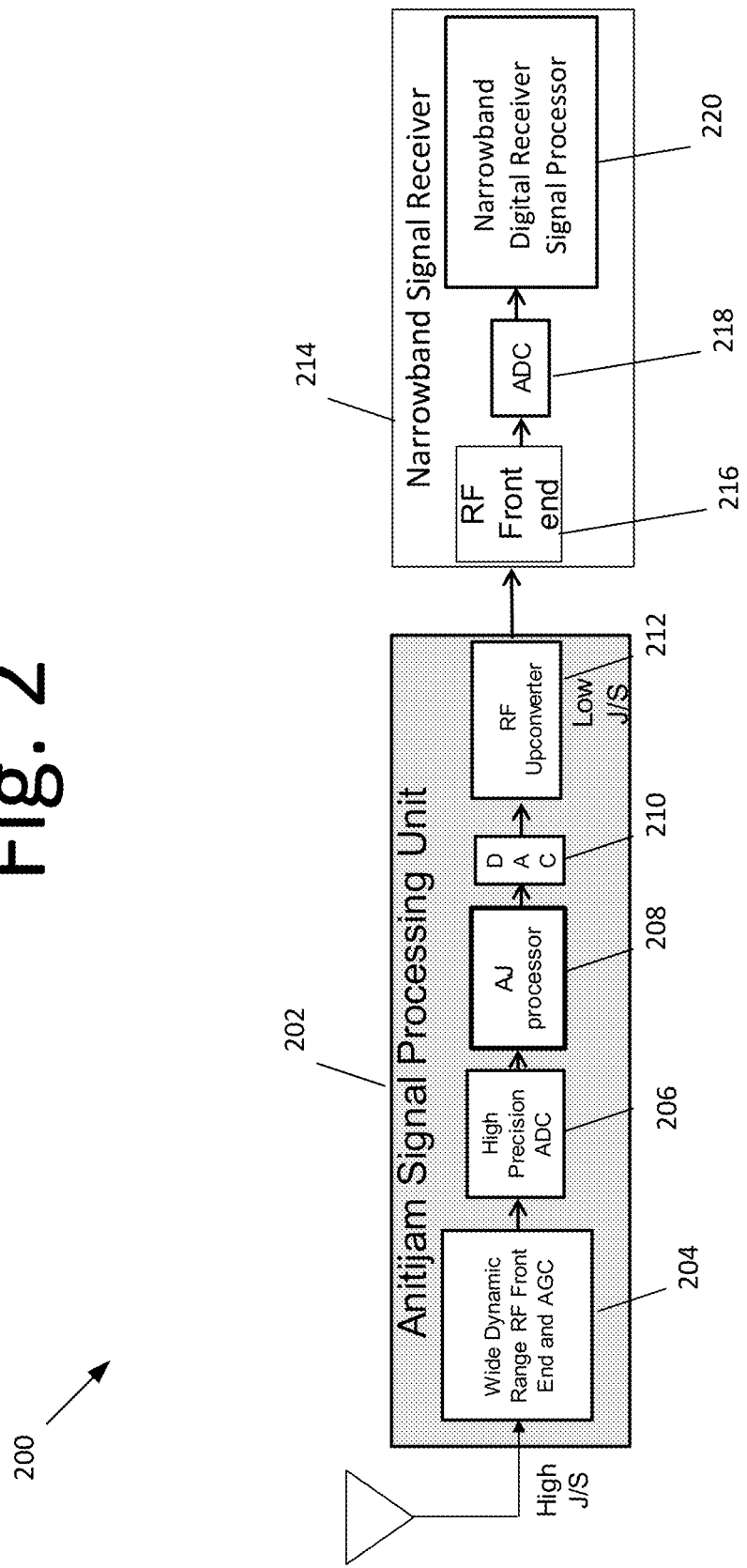
FIG. 2 is a block diagram illustrating a modular narrowband signaling system, according to an embodiment of the present invention.

FIG. 2 is a block diagram illustrating a modular narrowband signaling system 200 for NASS, according to an embodiment of the present invention. In some embodiments, narrowband signaling system 200 includes an AJ signal processing unit 202 and narrowband signal receiver 214. In this embodiment, AJ signal processing unit 202 includes wide dynamic range RF front end and automatic gain control module 204, high precision ADC 206, AJ processor 208, DAC 210, and RF upconverter 212, and narrowband signal receiver 214 includes RF front end 216, ADC 218, and narrowband digital receiver signal processor 220.

Wide dynamic range RF front end and automatic gain control module 204, high precision ADC 206, and AJ processor 208 of FIG. 2 may operate in a similar manner as those components described in FIG. 1. Unlike FIG. 1, however, DAC 210 follows AJ processor 208. In this embodiment DAC 210 converts the digitally processed signals from AJ processor 208 to the analog domain. DAC 210 may be high precision (≥18 bits) or low precision (<<14 bits) since the dynamic range requirements are reduced following AJ processor 208. A single DAC may be used to convert the digitally AJ processed signals to an IF frequency or a multi-channel DAC may be used to convert the digitally processed I and Q channel signals to I and Q channel baseband frequencies. Also, in this embodiment, RF upconverter 210 upconverts the processed digital signals from an IF frequency or from baseband I and Q channels. Various components of the AJ signal processing unit may be integrated together or may function as separate components. In other embodiments, and although not described in detail herein, additional components may be included in AJ signal processing unit 202.

Within narrowband signal receiver 214, RF front end 216 may be configured for application to GPS signal reception or communication signal reception as is the case for the RF front end 102 of FIG. 1. RF front end 216 may include one or more low noise amplifiers (not shown), one or more bandpass filter RF downconverters (not shown), and one or more AGCs (not shown). RF front end 102 of FIG. 1 may include a similar configuration to that of RF front end 216. RF front end 216 may output an IF signal prior to down conversion or it may output I and Q digital signals prior to ADC 218.

In this embodiment, ADC 218 may be a single or multi-channel ADC depending in whether it is digitizing an IF signal or I and Q signals at baseband. Since the jammer power is mostly suppressed by AJ processor 208, the required precision for ADC 218 may be reduced. Therefore, depending on the embodiment, ADC 218 may be a high precision ADC (≥18 bits) or a low precision (<<14 bits) ADC.

High precision ADC 206 used in some embodiments exploits ADCs having 18 to 24 or greater bits of resolution. This is distinguished from ADC converters used in C/A code civilian receivers that are traditionally low precision (<<14 bits) ADCs to save power and cost for mass market consumer applications. Further, the C/A code signal is unencrypted making the C/A code signal subject to spoofing attacks, further distinguishing C/A code receiver systems from the embodiments described herein.

High precision ADC 206 (having 18 or greater bits) may operate on a narrowband encrypted military signal having an occupied spectrum that is $\leq \frac{1}{10}^{th}$ of the M and P(Y) code spectrum. One exemplary narrowband signal is an encrypted pseudorandom noise code (PRN) signal that is chipped at 0.5115 Mchips/sec and centered at 10.23 MHz away from the L1 GPS carrier frequency located at 1575.42 MHz. Another example is a binary offset carrier (BOC) modulated signal that is constructed as the product of a 10.23 MHz sine or cosine phase square-wave subcarrier multiplied by a 0.5115 million chips per second (MCPS) spreading code. The nomenclature for BOC signals in GNSS systems is usually denoted by BOC(M,N), where M is the subcarrier frequency divided by $1.023 \times 10^6$ and N is the code chipping rate divided by $1.023 \times 10^6$. This signal may be denoted as BOC(10,0.5). While the BOC (10,0.5) signal is considered narrowband relative to the BOC(10,5) M code signal, it should be clear that other narrowband signals may also be used in conjunction with a NASS receiver. In this example, the signal is centered on either L1 and/or L2 GPS frequencies at 1575.42 MHz and/or 1227.60 MHz, respectively. The signal may be centered on other carrier frequencies as well. In the second example, the chip rate of the signal is $\frac{1}{10}^{th}$ of the chip rate of the M code signal, and therefore, the signal occupies about $\frac{1}{10}^{th}$ of the spectrum. This may be considered narrowband for the purpose of describing exemplary embodiments of the invention.

Figure 3:
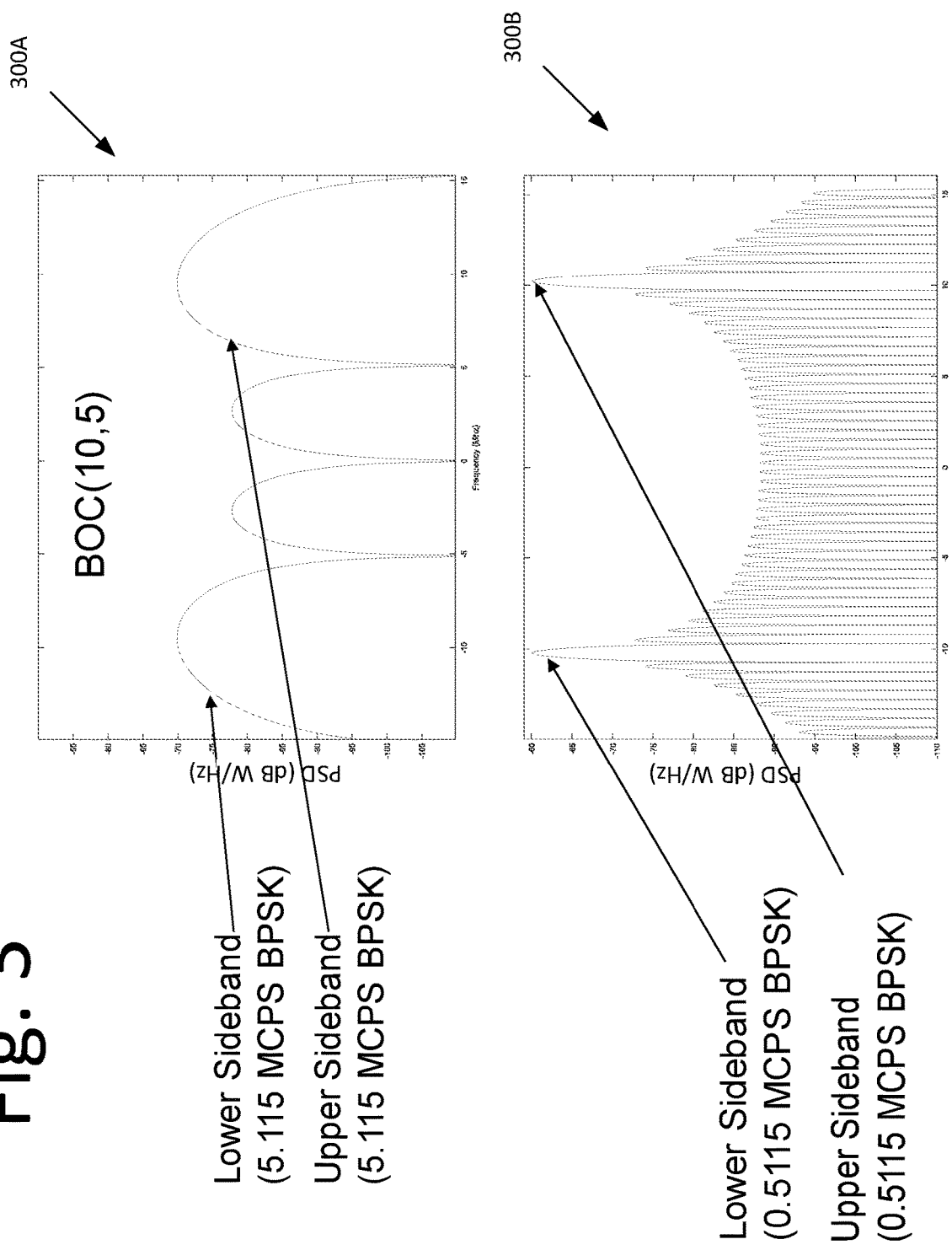
FIG. 3 shows plots of the power spectral density of the wideband BOC(10,5) signal and the narrowband BOC(10, 0.5) signal, according to an embodiment of the present invention.

Other narrowband signals, relative to the wideband GPS M code or P(Y) code encrypted signals, may include any spread spectrum signal that are $\leq \frac{1}{10}^{th}$ of the M and P(Y) code spectrum. For example, a BPSK 0.1 MCPS signal would meet this definition relative to the 10 MCPS Y code signal. In another example, a BOC(10,0.25) signal would also meet this definition. The spectrum of the BOC(10,5) M code and BOC(10,0.5) narrowband signal are shown in FIG. 3. In FIG. 3, the plots illustrate an upper and lower sidebands of the spreading code, which is modulated by the 10.23 MCPS BOC square-wave subcarrier.

In the BOC example, the upper and/or lower sidebands of the BOC signals are rotated to band center in a NASS receiver by using an analog downconverter. This may be achieved using existing hardware by offsetting the downconverter's local oscillator by +10.23 MHz or −10.23 MHz for upper and lower sidebands, respectively. For example, a NASS receiver that receives the BOC(10,0.5) signal may employ a number of approaches to sample the received signal using a high-precision narrowband ADC.

Referring to FIG. 1, wide dynamic range RF front end and AGC 102 may rotate one of the sidebands and utilize high precision ADC 104 having a 2 MHz or lower sample rate. This approach may be referred to as a single sideband narrowband signal receiver. Upper and lower sidebands of the BOC(10.5) M code signal and the BOC(10,0.5) narrowband signal are shown as a function of frequency in FIG. 3. FIG. 3 are plots 300A and 300B illustrating the lower and upper sidebands at BOC(10,5) and lower and upper sidebands, according to an embodiment of the present invention. In FIG. 3, plot 300A illustrates the power spectral density of the M code signal showing upper and lower sidebands at 10.23 MHz above the carrier frequency and 10.23 MHz below the L1 carrier frequency. In this illustration, the carrier frequency of zero Hz illustrates the signals at complex baseband (after conversion of the full OC signal to I and Q components). The signal spectrum viewed at the L1 or L2 carrier frequencies would be illustrated by adding the L1 or L2 carrier frequency to each number in the curve. Similarly, the upper and lower sidebands of the BOC(10,0.5) signal are shown in plot 300B. The single sideband NASS receiver operates only on one sideband.

In another embodiment, both sidebands may be processed at once. In such an embodiment, wide dynamic range RF front end and ADC 102 may downconvert the upper sideband and upconvert the lower sideband to produce downconverted upper and lower sidebands, Both the upper and lower sideband signals would each be processed by a separate AJ processor, one for the lower sideband signal and one for the upper sideband signal. Alternatively, both the upper sideband signal and the lower sideband signal would be received by the narrowband signal receiver.

In some embodiments, narrowband digital receiver signal processor 108 may perform joint processing of both upper and lower sidebands after AJ processor 106, while in other embodiments, the narrowband digital receiver signal processor 108 may separately process upper and lower sidebands and combine the results non-coherently. Other variations may also be employed such as time multiplexing the processing on either sideband.

Figure 4:
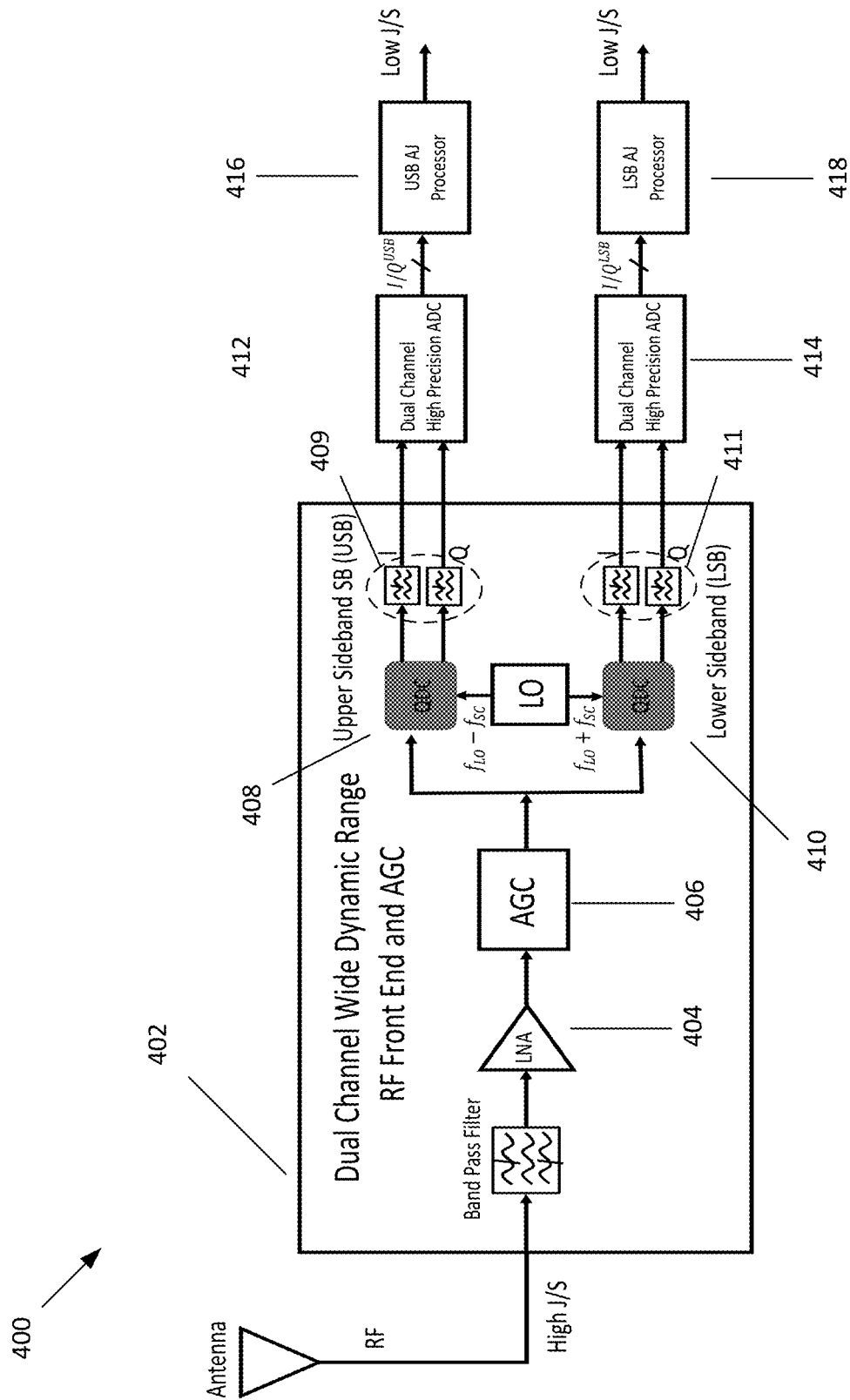
FIG. 4 is a diagram showing a dual channel Wide dynamic range RF front end and dual channel High resolution ADC prior or the AJ processor of a NASS applicable to binary offset carrier and related signals, according to an embodiment of the present invention.

A dual channel wide dynamic range RF front end and AGC capable of processing in this manner shown in FIG. 4. FIG. 4 is a diagram illustrating a dual channel wide dynamic range RF front end and AGC 402, according to an embodiment of the present invention. In this embodiment, dual channel wide dynamic range RF front end and ADC 402 uses a common low noise amplifier (LNA) 404 and AGC 406 to receive a narrowband BOC signal, such as BOC(10, 0.5) signal having a subcarrier frequency of $f_{sc}$=10.23 MHz.

Also, in this embodiment, dual channel wide dynamic range RF front end and AGC 402 includes dual quadrature downconversions (QDCs) 408 and 410. QDC 408 downconverts the 0.5115 MCPS spreading codes at the upper sideband (USB) frequency of 10.23 MHz above the carrier, and QDC 410 downconverts the 0.5115 MCPS spreading codes at the lower sideband (LSB) frequency of 10.23 MHz below the carrier to baseband (I/Q) or approximately zero Hz.

As illustrated by FIG. 4, in such an embodiment, separate quadrature downconversion stages can be used to downconvert the BOC signal out of AGC 406 to baseband I and Q components of the USB signal component and the LSB signal component. This may be followed by placing one or more low pass anti-aliasing filters 409, 411 prior to digitization by dual channel high precision ADC 412, 414 having 18 or more bits.

Alternatively, two single channel ADCs may be used to digitize I and Q components of the USB BPSK 0.5115 MCS PRN code with an additional two single high-precision ADCs used to digitize the I and Q components of the LSB BPSK 0.5115 MCPS PRN code. Other embodiments may employ a quad channel high precision ADC. In this example, a suitable sampling rate may be chosen between 1-1.5 MSamp/sec, depending on the bandwidth of the anti-aliasing low pass filters in FIG. 4. Following the high precision ADC channels, the I and Q signal components for the USB are input to a USB AJ signal processor 416 and the LSB signal components are input to a LSB AJ signal processor 418 to reduce the effect of the jammer resulting in a low J/S.

It should be appreciated that variations of this embodiment can also be performed in which the USB and LSB signal components are downconverted to an IF frequency and digitized using two single channel high precision ADCs (one for LSB and one for USB signal components). This may be followed by digital downconversion of the digital IF signal to baseband I and Q components prior to USB AJ processor 416 and LSB AJ processor 418.

In an exemplary embodiment, a signal is considered narrowband relative to a wideband system if it its spreading modulation occupies $\leq \frac{1}{10}^{th}$ the null-to-null bandwidth of spreading modulation used in a complementary wide bandwidth signaling system. In the case of direct sequence spread spectrum systems, this corresponds to having a chipping rate that is $\leq \frac{1}{10}^{th}$ that of the corresponding wideband system's chip rate. A narrowband system may be used in conjunction with a wideband signaling system as an augmentation to the wideband system or as an alternative to a wideband system.

Figure 5A:
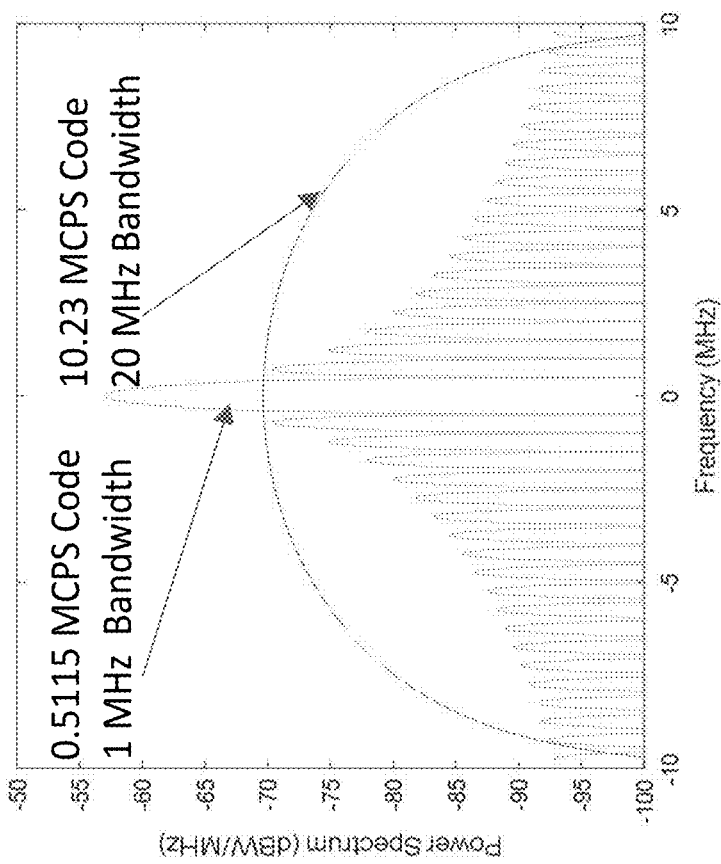
FIG. 5A is a plot of the power spectral density of a wideband 10.23 MCPS BPSK modulated spreading code and a narrowband 0.5115 MCPS spreading code, according to an embodiment of the present invention.
Figure 5B:
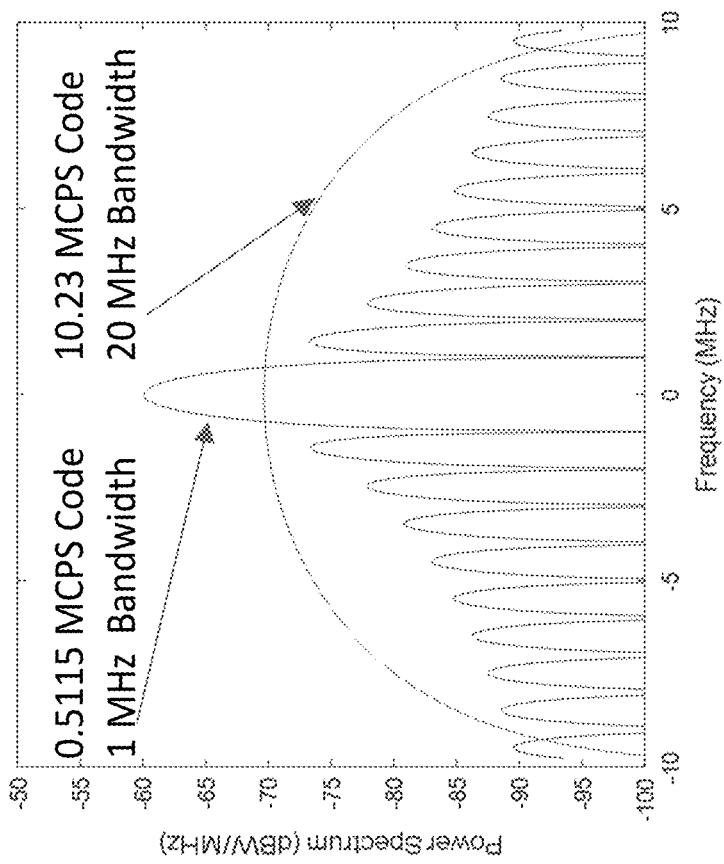
FIG. 5B is a plot of the power spectral density of a wideband 10.23 MCPS BPSK modulated spreading code and a narrowband 1.023 MCPS spreading code, according to an embodiment of the present invention.

FIGS. 5A and 5B are graphs 500A, 500B illustrating additional examples of NASS signals for BPSK and BOC signals, according to an embodiment of the present invention. In FIG. 5A, graph 500A depicts a 10.23 MCPS wideband signal having a 20 MHz null to null bandwidth, along with a narrowband 0.5115 MCPS signal having a 1 MHz bandwidth, i.e., $\leq \frac{1}{10}^{th}$ that of the wideband signal. In FIG. 5B, graph 500B shows another possible narrowband signal that has a 2 MHz bandwidth and a 1.023 MCPS chipping rate compared to the 10.23 MCPS wide bandwidth BPSK signal.

Figure 6:
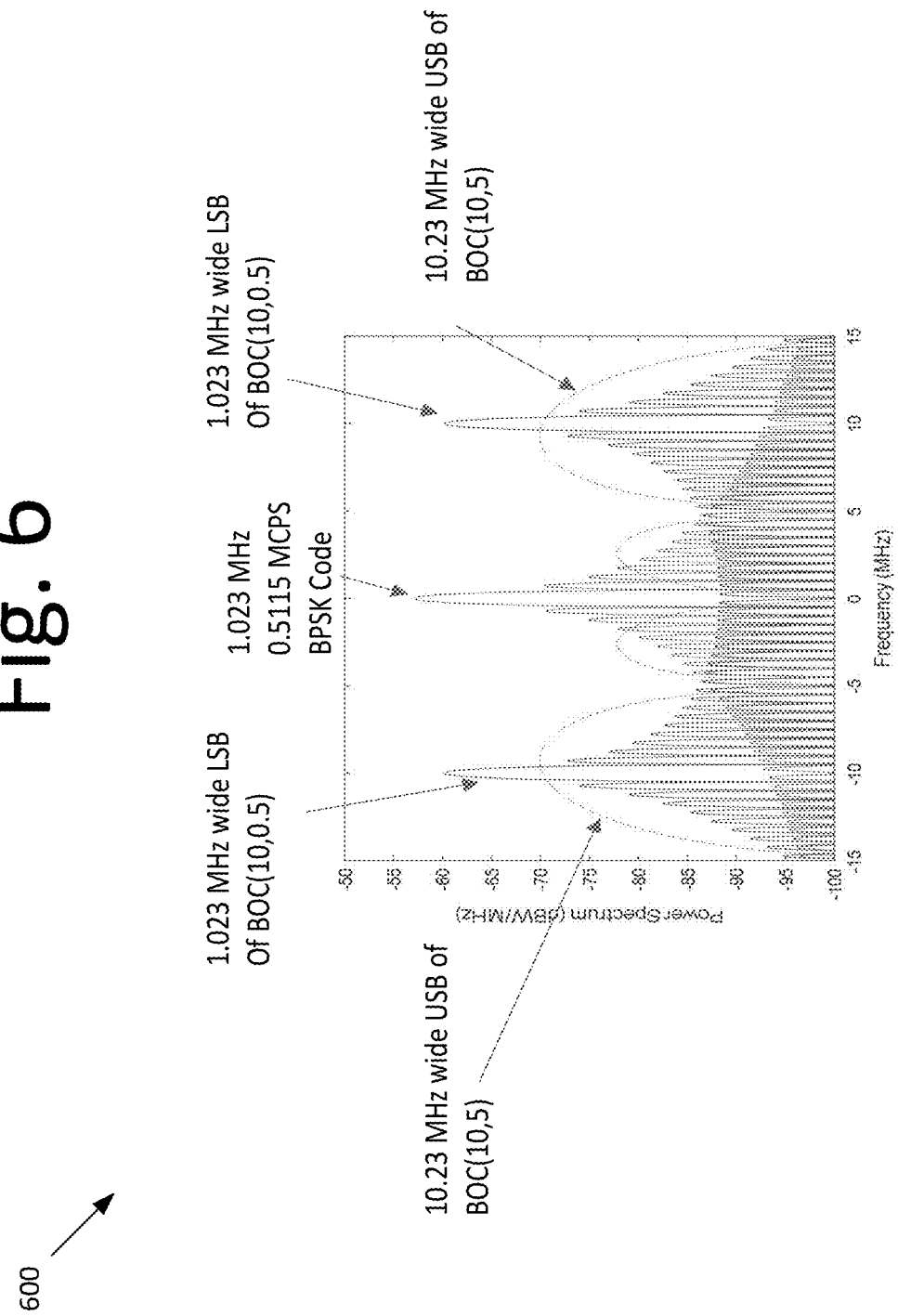
FIG. 6 is a plot of the power spectral density of a wideband BOC (10,5) signal having a 5.115 MCPS spreading code, a narrowband BOC(10,0.5) signal having a 0.5115 MCPS spreading code and a 0.5115 BPSK modulated spreading code, according to an embodiment of the present invention.

FIG. 6 is a graph 600 illustrating a wideband signal being a BOC(10,5), according to an embodiment of the present invention. In graph 600, wideband signal has a PRN code that is chipped at 5.115 MCPS, but also has a 10.23 MCPS square-wave subcarrier. In this case, both the BOC(10.5) signal and the 0.5115 MCPS BPSK spreading code signal are narrowband relative to either sideband of the BOC(10,5) signal. This is because the chip rates of both the BOC(10, 0.5) and BPSK 0.5115 spreading codes are $\leq \frac{1}{10}^{th}$ that of the wideband BOC signal, even though the BPSK 0.5115 signal is multiplied by a 10.23 MSPS square wave subcarrier, giving it an overall bandwidth>20 MHz. It should be appreciated that the BOC(10,0.5) signal has an upper sideband (USB) and lower sideband (LSB) bandwidths that are 1 MHz, each due to the BPSK 0.5115 PRN spreading codes.

It should be understood that variations of the NASS system may employ a narrowband DSSS signal that is optionally hopped over a wide bandwidth by regularly changing the center frequency of the DSSS PRN code signal, but having a chip rate that is $\leq \frac{1}{10}^{th}$ that of the corresponding wideband system's chip rate.

In the embodiments shown in FIGS. 1 and 2, the signal bandwidth (which is controlled by the signal's chip rate for direct sequence spread systems) is ≤⅒$^{th}$ of the chip rate of a wide-bandwidth system while using the high precision ADC having 18 or greater bits.

Note that, in alternative embodiments, wideband signaling receivers for M code, P(Y) code or other global navigation satellite signal (GNSS) receivers may produce a multi-mode receiver that operates as NASS signals to reduce power consumption and provide enhanced AJ processing. The wideband signaling receivers may also operate on conventional signals, for example, to demodulate navigation data from such systems or to optimize overall navigation performance dependent on the environmental conditions or receiver operating scenarios.

The achievable performance of AJ techniques is ultimately limited by the dynamic range of the system. In general, the tolerable J/S is related to the difference between the MSB of the ADC and the noise level. For example, if 85 dB of J/S is achievable with a 12-bit ADC, an additional 54 dB of jammer suppression would be realizable with a 21-bit ADC due to increased quantization range which increases as about 6.02 dB per bit. Therefore, the net improvement of a 10× lower signaling rate would be equal to 54 dB-10 dB (loss in processing gain). This results in approximately 44 dB or a factor of 25119 improvement in tolerable jammer power, or tolerable J/S for the same signal power level, for a NASS (combining both AJ processing and a narrowband AJ signal system (NASS) receiver's AJ performance), as compared to wideband signaling receivers This may also result in improved AJ performance for the narrowband system which is contrary to conventional wisdom in which a wideband AJ system is expected to result in greater resistance to jamming than a narrowband AJ system.

Figure 7:
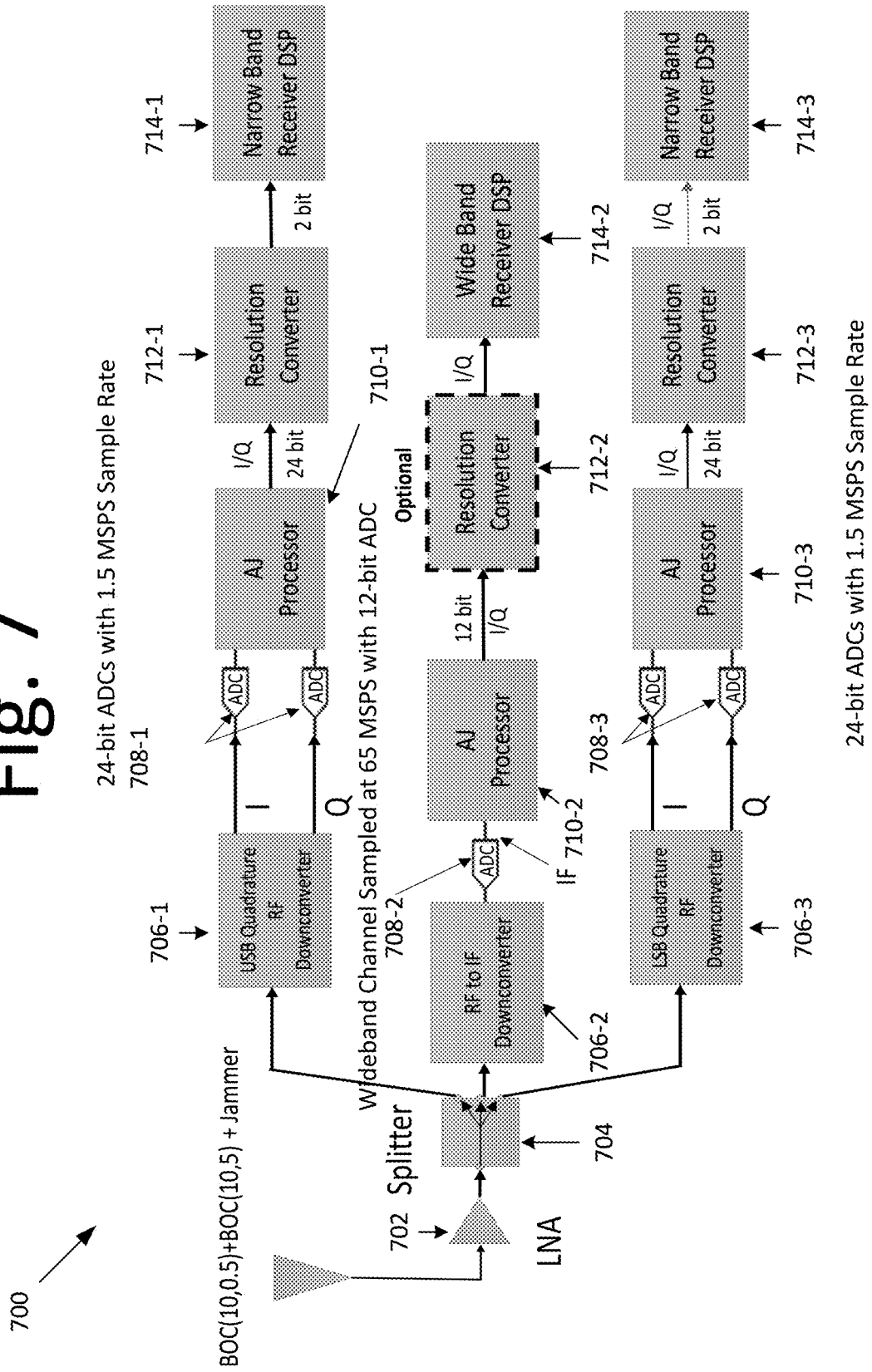
FIG. 7 is a block diagram illustrating a multi-mode receiver 600, according to an embodiment of the present invention.

FIG. 7 is a block diagram illustrating a multi-mode receiver 700, according to an embodiment of the present invention. In some embodiments, multi-mode receiver 700 receives a signal containing BOC(10,0.5)+BOC(10,5)+jammer. Low noise amplifier (LNA) 702 may amplify this signal allowing splitter 604 to split signal into three separate channels. The reason for the wide-band and narrowband channels is because there may be tracking channels that do not work well when splitting out upper sideband and lower sideband signals. This way, the AJ processor can use higher precision to perform antijam for upper and lower sidebands. The goal of this implementation is to take advantage of high bit precision for the narrowband receiver digital signal processors 714-1, 714-2, and 714-3.

In an embodiment, multi-mode receiver 700 processes a narrowband BOC(10,0.5) signal in a number of different ways. In one example, USB quadrature RF downconverters 706-1 and 706-3 are respectively configured to downconvert an USB and a LSB of the BOC(10,0.5) signal using conventional means previously applied to the BOC(10,5) signal and related modulation. More details regarding the downconverting process can be found in P. A. Dafesh and J. K. Holmes, "Practical and Theoretical Tradeoffs of Active Parallel Correlator and Passive Matched Filter Acquisition Implementations", Proceedings of the IAIN World Congress and the 56th Annual Meeting of The Institute of Navigation, 2000 or in the discussion of FIG. 4 above. By performing downconverting of the USB and LSB of the BOC (10,0.5) signal, narrowband sideband components of the BOC(10, 0.5) signal is generated.

As shown in FIG. 7, the USB and the LSB components of the BOC(10,0.5) signal are mixed or rotated (down and up respectively), and then filtered by a bandpass filter. This results in keeping only the power contained in the main lobe of the resultant 0.5115 MCPS BPSK signal, which is approximately 1 MHz wide. Because the signal bandwidth is sufficiently narrow <<1.5 MHz, a 1.5 MHz baseband ADC sampling rate is employed in high-resolution ADC 708-1 and 708-3. High-resolution ADC 708-1 and 708 may be a 24-bit ADC, for example.

Further, because the signal is sampled with high-resolution ADC 708-1 and 708-3, the ability to resolve the jammer's power (J) relative to the noise floor is greatly enhanced, thereby increasing the maximum jammer that may be tolerated. For example, the 24-bit ADC enables more than a 30 dB improvement in dynamic range (tolerable jammer power), compared to a 12-bit ADC typical of wide-bandwidth AJ systems in which chipping rate of the PRN code is at least 10 times greater.

In this embodiment, AJ processors 710-1 and 710-3 are configured to suppress the effect of the jammer signal. For example, a narrowband jammer that jams a portion of the USB and LSB spectrum of the BOC(10,0.5) signal, for example, by notching out 10% of the upper and lower sideband power spectrum (e.g., see graph 300B in FIG. 3), the impact of the jammer may be effectively mitigated by AJ processors 710-1 and 710-3 that employs narrowband excision using an Fast Fourier Transform (FFT) or an adaptive transversal filter. Alternatively, AJ processors 710-1 and 710-3 may use an amplitude domain suppression technique or may optimally select one or more antijam suppression techniques. In general, AJ processors 710-1 and 710-3 may employ one or more techniques including frequency domain excision, time domain excision, spatial nulling and/or beamforming using multi-element antennas, wavelet excision, amplitude domain, or some combination of approaches designed to reduce the effect of the jamming signal on the victim narrowband signal receiver.

After AJ processor, the bit depth of the signal plus noise is reduced using a thresholding circuit. In some embodiments, the bit depth is reduced to 2 bits to enable the subsequent acquisition and tracking circuits to conserve power by reducing the number of operations per second for more efficient power operations. Generally, the number of operations per second scales with the bit resolution.

In other embodiments, multi-mode NASS receiver 700 also concurrently tracks wide-bandwidth signals, such as the BOC(10,5) M code signal, using a ADC 708-2. In this embodiment, the ADC 708-2 performs IF sampling at 65 MHz or any other suitably chosen sample rate. As shown in FIG. 7, RF to IF downconverter 706-2 in the third channel, followed by a 65 MHz ADC 708-2 digitizes the IF signal. After the IF signal is digitized, AJ processor 710-2 is configured to convert digitized IF signal to baseband (I/Q). AJ processor 710-2 may suppress jammers using a conventional technique described above. It should be appreciated that AJ processor 710-2 may be disabled in some embodiments and may digitally downconvert the IF signal to baseband (I/Q). By providing a wide-band signal channel in addition to the narrowband signal channel, multi-mode receiver 700 may be more resilient to jamming. For example, if a jammer attempts to jam the M code signal by matching to its spectrum, the jammer power seen by the narrowband BOC(10,0.5) signal is reduced by approximately 10 dB. On the other hand, if a jammer matches its spectrum to the BOC(10,0.5) signal, it may be excised using standard narrowband excision AJ approaches. Therefore, multi-mode receiver 600 enables improved performance compared to processing the M code or narrowband BOC (10,0.5) signal alone. It should be appreciated that in some embodiments of FIG. 6, the wideband signal path and wideband receiver DSP may be omitted.

It should be noted that resolution converter 712-1 was described above, and narrowband receiver DSPs 714-1 and 714-3 are configured to operate similar to narrowband digital receiver signal processor 108 except that they operate on the upper sideband and lower sideband after a resolution converter. In some embodiments, narrowband receiver DSPs 714-1 and 714-3 may be combined into a single combined narrowband digital receiver signal processor, as described in FIG. 1 at 108 and FIG. 2 at 220.

Jam Resistant Acquisition Circuit and System for Processing Narrowband Signals

Modern GPS M and P(Y) code receivers use multiple parallel correlators to rapidly search time and frequency hypotheses in parallel. Each hypothesis may represent the possible time and frequency offsets of the signal from a receiver's local estimate of time and frequency. One approach to implementing a large number of correlators in parallel is to time share the same logic (e.g., multiply and accumulate operations) over and over by running the receiver's processor at a rate that is much faster than the incoming sample rate. In this approach, $R_c$=chip rate and assume that the physical correlators are time shared by processor operating at a clock rate $f_c \gg 2R_c$.

Further, letting the number of physical correlators be denoted by $N_p$, the number of time correlations performed in parallel is given by $N_{corr}$. In some embodiments, this number describes an effective number of time correlators and is given by $$N_{corr} = \left(\frac{f_c}{2R_c}\right)N_p \qquad \text{Equation (1)}$$

Because the number of correlators is related to the time searched in parallel, the time to acquire increases inversely proportional to the number of correlators. For example, with the NASS system, it is easy to show that, for the same number of physical correlators and processor clock rate, a BOC(10,0.5) receiver can search hypothesis up to 100 times faster when no jamming is present.

In some embodiments of a NASS, the TTFA can be expressed in terms of the number of hypothesis searched divided by the number of hypothesis searched in parallel all multiplied by the overall signal dwell period. The overall signal dwell period is given by the product of the coherent integration period, $T_i$ multiplied by the number of noncoherent integrations, $N_{nc}$. This total number of noncoherent integrations is typically limited to a practical level so that its duration does not exceed about 10 seconds depending on the dynamical constraints imposed on the receiver.

Therefore, the TTFA is given by $$TTFA = T_i N_{nc} \frac{\Delta T \cdot 2R_c \cdot \Delta F}{N_t F} =$$

$$T_i N_{nc} \left[\frac{\Delta T \cdot 2R_c}{\left(\frac{f_c}{2R_c}\right)N_p}\right]\left[\frac{\Delta F}{F}\right] \propto R_c^2 N_{nc}(R_c, J/S, T_i) \qquad \text{Equation (2)}$$

where $T_i$ is coherent integration time, $\Delta T$ is the initial time uncertainty (ITU), F ae the number of frequency hypothesis searched in parallel, $\Delta f$ is the initial frequency uncertainty, $R_c$ is the chip rate, $N_{nc}$ is the number of noncoherent integrations. The number of time hypothesis to search is given by $\Delta T \cdot 2R_c$ assuming 2 samples per chip, $f_c$ is the acquisition engine clock rate, and $N_p$ is the number of physical correlators.

$$\left(\frac{f_c}{2R_c}\right)N_p$$

is the total number of correlators used in an active parallel correlator implementation such as the one described in P. A. Dafesh and J. K. Holmes, "Practical and Theoretical Tradeoffs of Active Parallel Correlator and Passive Matched Filter Acquisition Implementations, "Proceedings of the IAIN World Congress and the 56th Annual Meeting of The Institute of Navigation, 2000. In other embodiments and passive matched filter may be used having a matched filter length that may be adapted to different coherent integration periods. It should be noted that $N_{nc}$ increases slowly with decreasing chip rate due to the fact that the processing gain changes approximately linearly with chip rate, $N_{nc}$ is a nonlinear function of the processing gain, and $R_c^2$ decreases rapidly with decreasing chip rate. Using this equation, TTFA and AJ performance may be improved, thereby also improving TTFF. The TTFF is given by $$TTFF=TTFA+t+t_x+t_{data} \qquad \text{Equation (3)}$$

where TTFA is the time to first satellite signal acquisition given previously, $t_{data}$ is the time to read the data message if navigation data is obtained from the satellite signal. If this data is obtained from a data assistance channel, the value of $t_{data}$ may be greatly reduced or eliminated. $t_x$ is comprised of the time to acquire the remaining satellites, loop settling times, and time to compute a navigation solution. Additional time may be required to compute a first fix depending in a specific receiver implementation.

Note that the number of hypothesis per unit time is also proportional to the chip rate. Lower chip rates result in fewer hypotheses to search for a given initial time uncertainty.

Because $TTFA \propto R_c^2 N_{nc}$, for the exemplary NASS (BOC (10, 0.5)) signal, an acquisition time speedup of up to 100 times is possible, compared to a BOC(10,5) signal when jamming isn't present. For the case of higher jamming such as when the J/S level is 30 dB or higher, a lower speedup is observed. A greater benefit under jamming may be obtained by employing a longer coherent integration period, e.g., 100 ms even without an AJ processor. The performance gains in table 800 shown in FIG. 8 assume BOC(10,5) and BOC(10, 0.5) acquisition engines have maximum of 100 ms coherent integration times. It should be appreciated, however, that better performance may be achieved with alternative implementations permitting even longer coherent integration periods. This may be subject to the receiver dynamics constraints and whether or not these dynamics are compensated for during coherent integration.

In one embodiment, by employing dataless NASS signal and long coherent integration times up to 100 ms or longer, a net benefit is observed for the exemplary NASS system as compared to the conventional wideband M code signal. In other words, since the number of noncoherent accumulations depends on the effective carrier to noise ratio, which increases with coherent integration period and effective signal bandwidth. For a given NASS chip rate and J/S level, a corresponding optimum coherent integration period can be selected to minimize acquisition search time and achieve superior performance compared to a wideband signal receiver. In the current example, an optimal NASS coherent integration period was selected between 10-100 ms. In other examples, a longer range of coherent integration periods may be used to achieve even improved performance.

In some embodiments, an optimal coherent integration period may be optimally selected as a function of the effective carrier power to noise spectral density Ratio, as defined by $$\left(\frac{C}{N_0}\right)_{Eff} = \frac{C}{N_0 + J_0} = \frac{C}{N_0 + J/B_{eff}} \quad \text{Equation (4)}$$

where $B_{eff}$ is an effective jammer bandwidth given by the inverse of the spectral separation coefficient between the signal having power C and Jammer having power level J, and $N_0$ is the noise power spectral density in dBW/Hz. This equation may also be expressed in terms of J/S, as defined by $$\left(\frac{C}{N_0}\right)_{Eff} = \frac{1}{\left(\frac{C}{N_0}\right)^{-1} + (J/S)/B_{eff}} \quad \text{Equation (5)}$$

where S=C is the signal power. In these instances, the optimal coherent integration period may be selected to minimize TTFA for a given probability of detection and probability of false alarm where the number of noncoherent integrations is a function of the probability of detection and probability of false alarm and the coherent integration period. In other embodiments, the optimal coherent integration period is selected to minimize the overall dwell period, where the overall dwell period, $\tau_d$ is given by the product $\tau_d = T_i N_{nc}$, where TTFA$\propto \tau_d$. In some embodiments, this minimization may be computed as a function of the effective carrier to noise ration ahead of time and pre-programmed into the receiver using a lookup table. In other embodiments, the minimization may be computed in the receiver after measurement of the effective carrier to noise power spectral density ratio. In either embodiment, both the dwell period and the TTFA are minimized as a function of the coherent integration period.

The combined effects of long coherent integration times and 10× or lower NASS chip rates enable enhanced performance even at higher J/S levels. This enhanced performance may be achieved even without an AJ processor.

Figure 8:
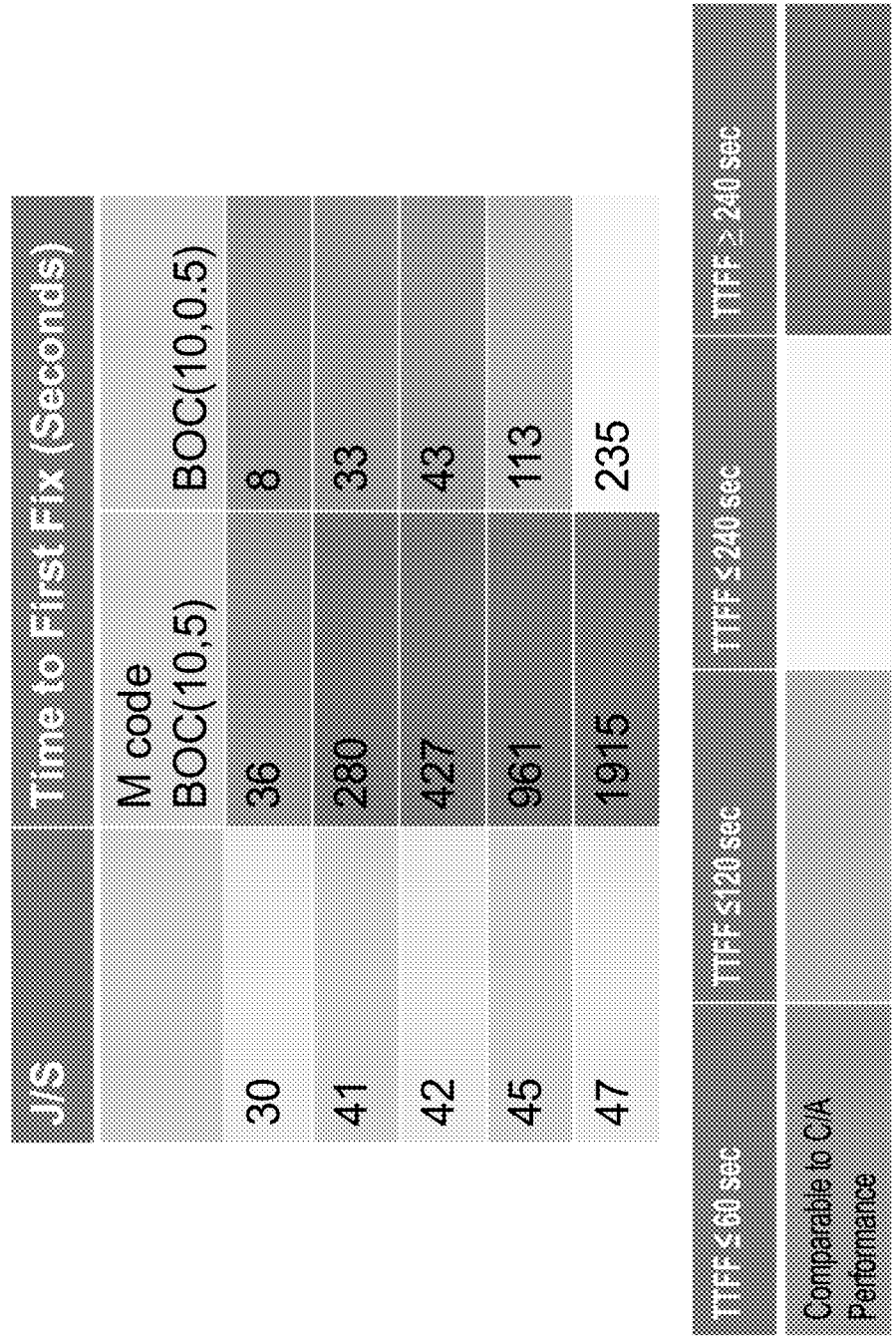
FIG. 8 is a table illustrating the warm-start acquisition time for first fix for a low SWAP receiver with navigation data, according to an embodiment of the present invention.

See, for example, FIG. 8, which shows a table 800 illustrating improvement in warm start TTFF for the BOC (10,0.5) NASS receiver as compared to the conventional wideband M code receiver. The receiver in this example is assumed to have $N_p$=500 physical correlators that are time shared by operating the acquisition circuit operating at a clock rate of $f_c$, =100 MHz. The receiver is further assumed to have navigation data from an external source (e.g., long term orbital and clock information obtained over a network) and a standby oscillator with a drift rate of 1 part per million (ppm) and having had 3 days since its last fix. Thus, the initial time uncertainty is assumed to be +/−259 ms. As seen from the data, excellent TTFF performance, is observed up to a J/S level of 42 dB and superior NASS TTFF performance is observed up to a J/S of 47 dB. In this example, the coherent integration period was selected for each TTFF value to minimize TTFF. In one embodiment, this may be achieved by measuring the Jammer to noise level and estimating J/S level from the expected receiver noise floor as compared to the measured carrier to noise density level when jamming is not present. Alternative techniques may also be employed to measure the J/S level.

Figure 9:
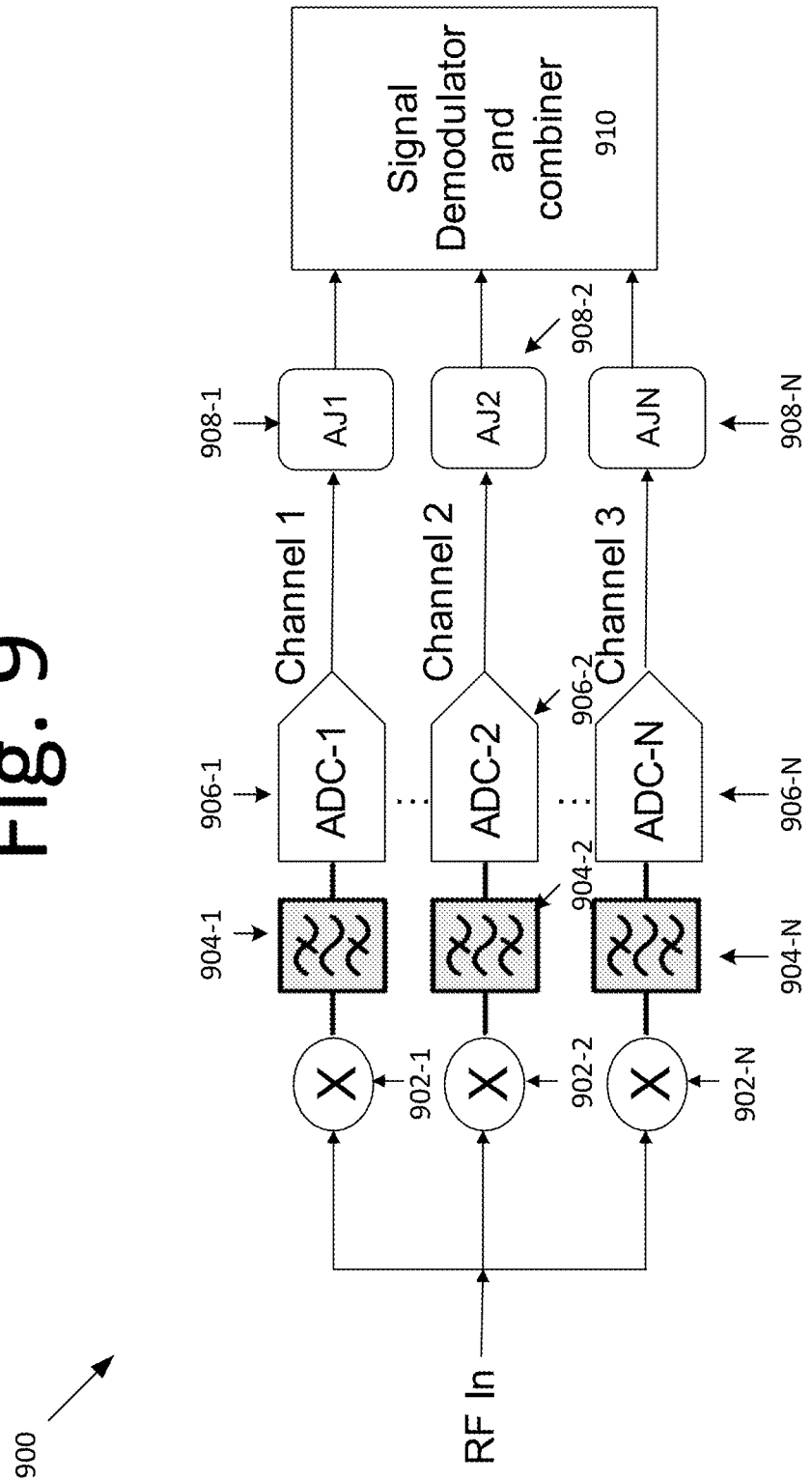
FIG. 9 is diagram illustrating a system for NASS channelization of a wideband data communication system, according to an embodiment of the present invention.

FIG. 9 is a block diagram illustrating NASS channelization of wideband communication system receiver using NASS 900, according to an embodiment of the present invention. In some embodiments, NASS 900 includes a downconverter 902-1 . . . 902-N, bandpass filter 904-1 . . . 904-N, ADC 906-1 . . . 906-N, AJ processor 908-1 . . . 908-N, and a signal demodulator and combiner 910. For purposes of explanation, let us consider the first of M channels. In this example, the RF downconverter 902 downconverts the RF signal to an IF. Downconverter 902, which is followed by a bandpass filter (BPF) 904-1 is configured to filter out frequencies beyond the bandwidth of the signal. This bandwidth may be its null to null bandwidth or some other bandwidth selected to optimize overall system efficiency and throughput. Following BPF 904-1 is an ADC 906-1. In some embodiments, ADC 906-1 is a high resolution ADC. ADC 906-1 may digitize the narrowband signal component of a wide band signal (e.g., 1 MHz of a 100 MHz wide signal). In this embodiment, ADC 906-1 is situated between BPF 904-1 and AJ processor 908-1. AJ processor 908-1 may suppress jamming from component one of the overall signals. Each subsequent channel of the N channels performs identical processing but at a different frequency. Further, each frequency is selected to avoid interference with adjacent channels 1-N.

The transmitted data is therefore multiplexed onto N channels, each processed separately to take advantage of the significantly improved dynamic range and ADC precision for each channel. This allows for greater overall AJ performance as compared to the wideband communication system receiver. The outputs of each of the N channels is fed into signal demodulator and combiner 910, which demultiplexes the data contained on the N channels, to reconstruct the original channelized data. Each channel may contain M subchannels corresponding to elements of a multi-element antenna. In such an example, there may be N×M total channels fed into N AJ processors, which may apply spatial nulling and/or beamforming techniques to remove jammers in each of N channels. In other embodiments, the channels may be part of an Orthogonal Frequency Division Multiplexing (OFDM) system used for wireless communications such as 4G or 5G, or alternatively, in Wi-Fi systems such as 802.11 or similar systems.

Put simply, with the embodiment shown in FIG. 9, data is multiplexed over N low rate channels such that the bandwidth of each channel is ≤1 MHz. For example, 100 MHz data may be multiplexed over 100 channels. Alternatively, fewer channels may be used, and each channel may be made wider. For example, in one embodiment, ten 100 MHz channels are used in a 1 GHz channel. The signals may be combined using a constant envelope combining techniques. See, for example, U.S. Pat. Nos. 8,774,315 B2, 9,197,282 B2, or U.S. Patent Application Publication No. 2011/0051783 A1.

Alternatively, other constant envelope or nonconstant envelope signal combining techniques may be used to combine constant envelope signals at different frequencies. This may enable use of high-resolution ADCs, which have significantly greater number of bits. For single element AJ techniques, there is only one ADC at each frequency. However, with multi-antenna AJ techniques, there may be M ADCs at each frequency (Channel) for a total of M×N ADCs, each operating at a low sample rate≤2 MHz.

Existing AJ solutions rely on the processing of wideband signals such as M code (for navigation) or protected tactical communication for Satcom. These signaling approaches are limited by availability of spectrum and by availability of high precision, wide bandwidth ADC technology.

By jointly designing the signal with consideration for dynamic range of AJ, the electronics in some embodiments improves AJ performance. Further some embodiments may relax spectrum availability requirements, enable better spectrum compatibility with other signals, and enable low SWAP receivers with faster signal acquisition times.

The embodiments may also allow for up to 44 dB improvement in AJ performance. This can be seen by comparing BOC(10,0.5) NASS technique using an ADC with 21 effective bits as compared to the conventional BOC(10,5) signal receiver and AJ processor using an ADC with 12 effective bits.

Additional improvements in TTFF may be achieved by selecting an optimal coherent integration period (e.g., 10-100 ms) as a function of jammer level.

Figure 10:
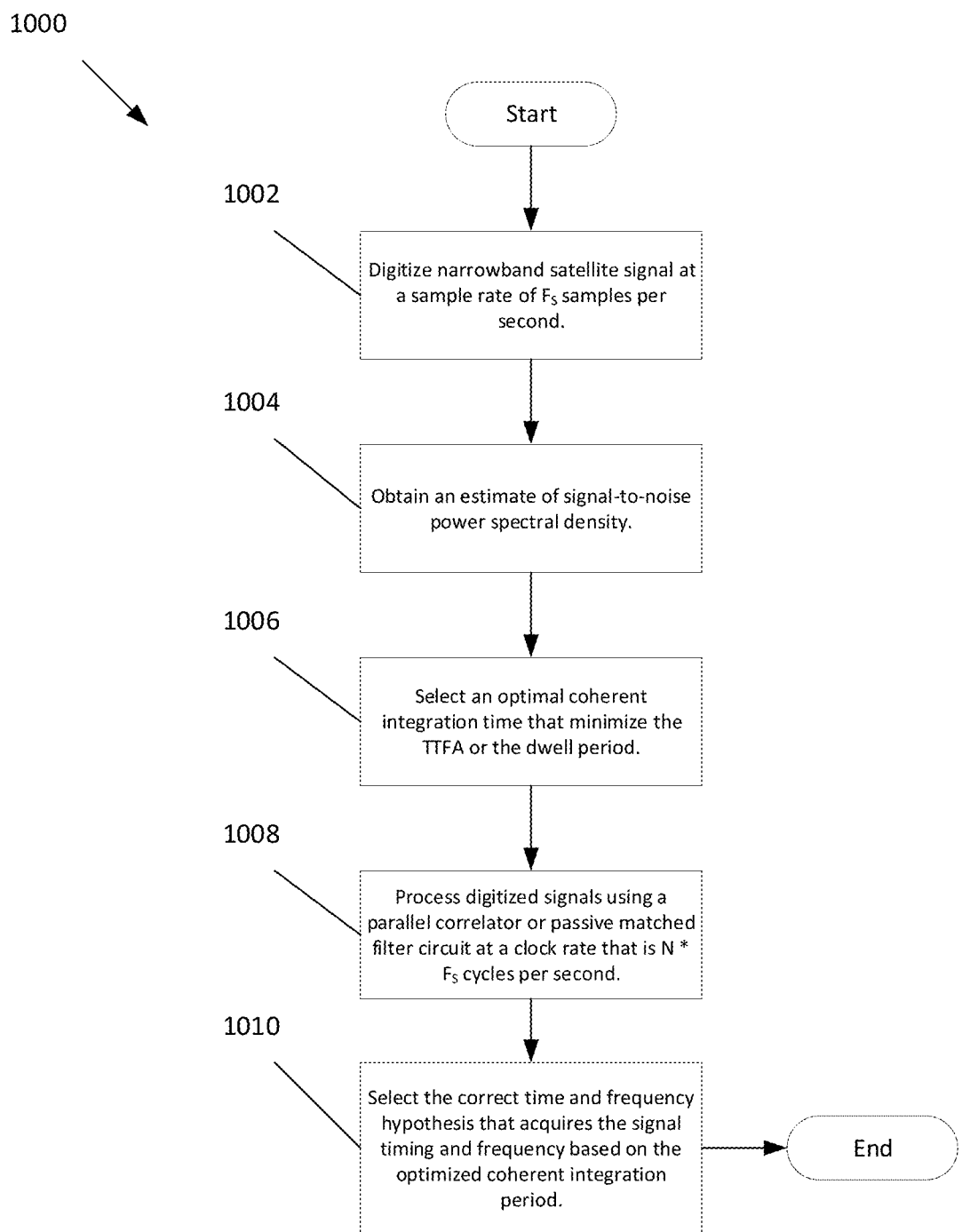
FIG. 10 is a flow diagram illustrating a method for acquiring a signal timing and a frequency without a high precision ADC and a AJ processor, according to an embodiment of the present invention.

FIG. 10 is a flow diagram illustrating a method 1000 for acquiring a signal timing and a frequency without a high precision ADC and a AJ processor, according to an embodiment of the present invention. In some embodiments, method 1000 begins at 1002 with digitizing a narrowband satellite signal at a sample rate of $F_S$ samples per second. At 1004, an estimate of a signal-to-noise power spectral density is obtained, and at 1006, an optimal coherent integration time is selected. The optimal coherent integration time is configured to minimize a Time to First Acquisition (TTFA) or overall dwell period subject to a desired detection and false alarm probability. At 1008, one or more digitized signal is processed at a clock rate that is $N \cdot F_S$ cycles per second to perform N operations every sample of an ADC clock rate. The processing of the one or more digitized signal is performed by a parallel correlator or a passive matched filter acquisition circuit. At 1010, a correct time and frequency hypothesis is selected. The correct time and frequency hypothesis are configured to acquire a signal timing and frequency based on an optimized coherent integration period.

Figure 11:
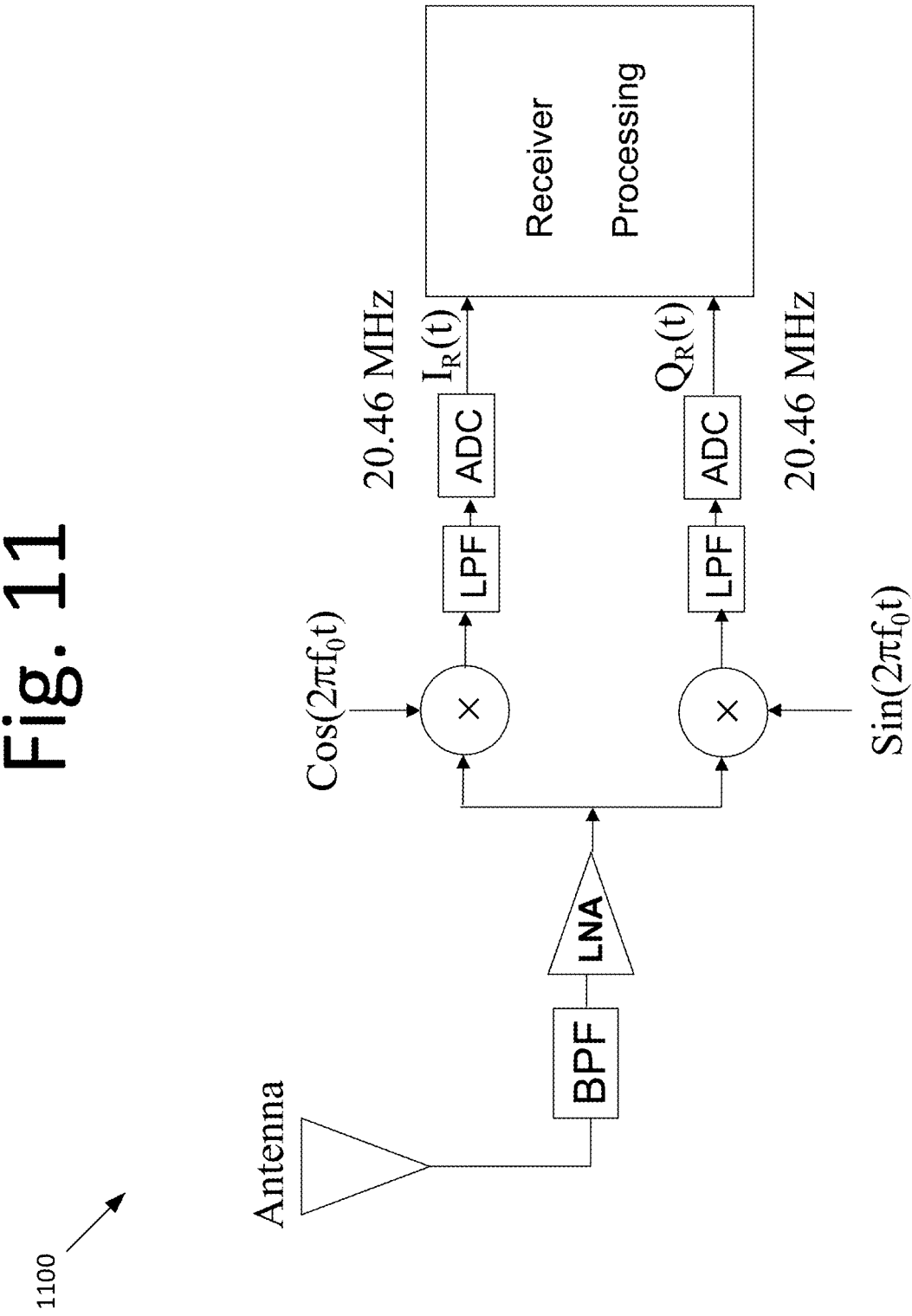
FIG. 11 is a block diagram illustrating a top-level GPS code receiver, according to an embodiment of the present invention.

FIG. 11 is a block diagram illustrating a top-level narrow band GNSS signal receiver 1000, according to an embodiment of the present invention. In this embodiment, FIG. 11 shows a functionally equivalent top-level GNSS-receiver processing diagram for a typical receiver 100. In this example, the receiver's 100 baseband processing rate is given in terms of a baseband-sampling rate ($F_s^{BB}$) during acquisition. For a narrow band receiver 100, a typical value is roughly $F_s^{BB}=2 \times R_c$ MHz where $R_c$ is the narrow band chip rate. In some embodiments, sample rate will be slightly larger than this value.

In one embodiment, the narrow band receiver acquisition circuit performs an initial parallel correlation over a shorter coherent integration period of time period of $T_{i0}$ using a vector correlator that performs $N_{corr}$ time correlations in parallel. See, for example, FIG. 12, which is a block diagram illustrating a complex multi-tap vector correlator 1200, according to an embodiment of the present invention. The $N_{corr}$ tap vector correlator is comprised of $N_{corr}$ multiply and accumulate operations, one for each time hypothesis.

Figure 12:
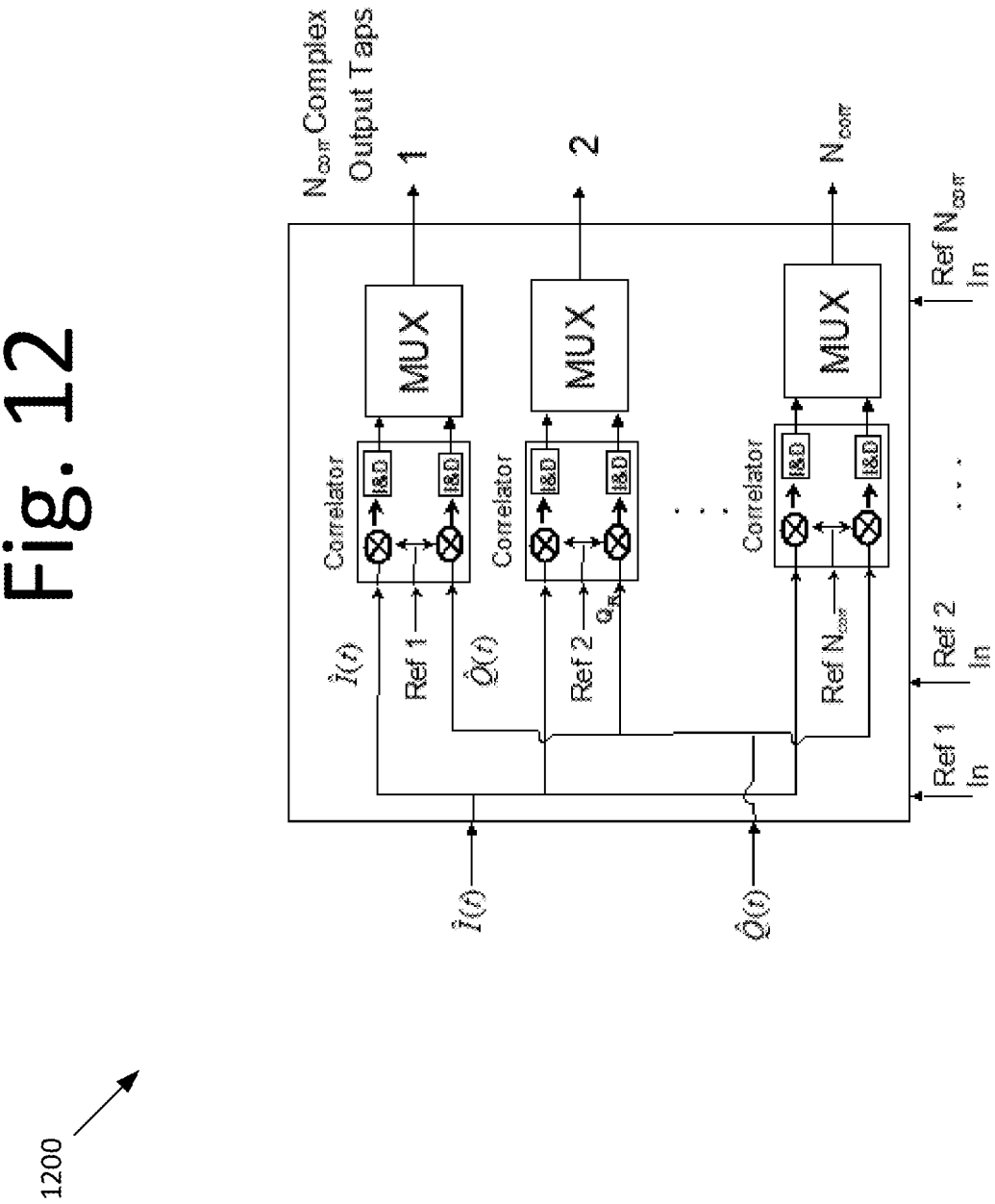
FIG. 12 is a block diagram illustrating a complex multi-tap vector correlator, according to an embodiment of the present invention.

In addition to the parallel time hypothesis search conducted by the vector correlator in FIG. 12, a search over the receiver's frequency uncertainty is necessary. This search is conducted in increments of frequency, δf, that are limited by the receiver's tolerable Doppler uncertainty over the coherent integration period. To see this, consider the square of the mean value of the magnitude of the complex outputs of the noncoherent correlator (I and Q channels of a single complex tap of the multi-tap correlator.

Following the vector correlator, a $N_{FFT}$ tap (point) FFT is performed, which produces $N_{FFT} \times N_{corr}$ time frequency cells, each with a coherent integration period of $T_i = T_{i0} \times N_{FFT}$. In alternate embodiments, a Discrete Fourier Transform (DFT) may be used instead of an FFT.

In some embodiments, the number of time-frequency hypotheses searched in parallel is given by $N_{corr} \times N_{FFT}$, in other embodiments, the number of time-frequency hypotheses searched in parallel is given by $N_{corr} \times \alpha N_{FFT}$ where $\alpha < 1$. For example, as described below, only the center ½ of the bins may be searched in order to limit the frequency quantization loss to 0.91 dB. In this case, the number of cells searched in parallel is $0.5 \times N_{corr} \times N_{FFT}$.

In the case of a BOC signal—a second vector correlator may be used to operate on the $\hat{I}$ and $\hat{Q}$ signals of the USB (not shown), while a first vector correlator operates on the $\hat{I}$ and $\hat{Q}$ signals of the LSB (not shown).

The mean value of the correlator 1200 output provides a measure of the signal power. This power, however, is weighted by a sin(x)/x function, resulting in a frequency quantization loss.

In a parallel frequency search implementation (using an FFT), the total frequency uncertainty, Δf, is broken up into some number of segments of width $\Delta f_{FFT}$ If the FFT searches the entire frequency uncertainty in parallel, $\Delta f = \Delta f_{FFT}$. As described above, the search is conducted by first performing a short integration over a period $T_{i0} < T_i$. Consider first, the case of an FFT without zero padding. In such a case, the notation $N^0_{FFT}$ is used to denote the size of an FFT without zero padding and $N_{FFT}$ is used to denote the size of an FFT with zero padding.

Figure 13:
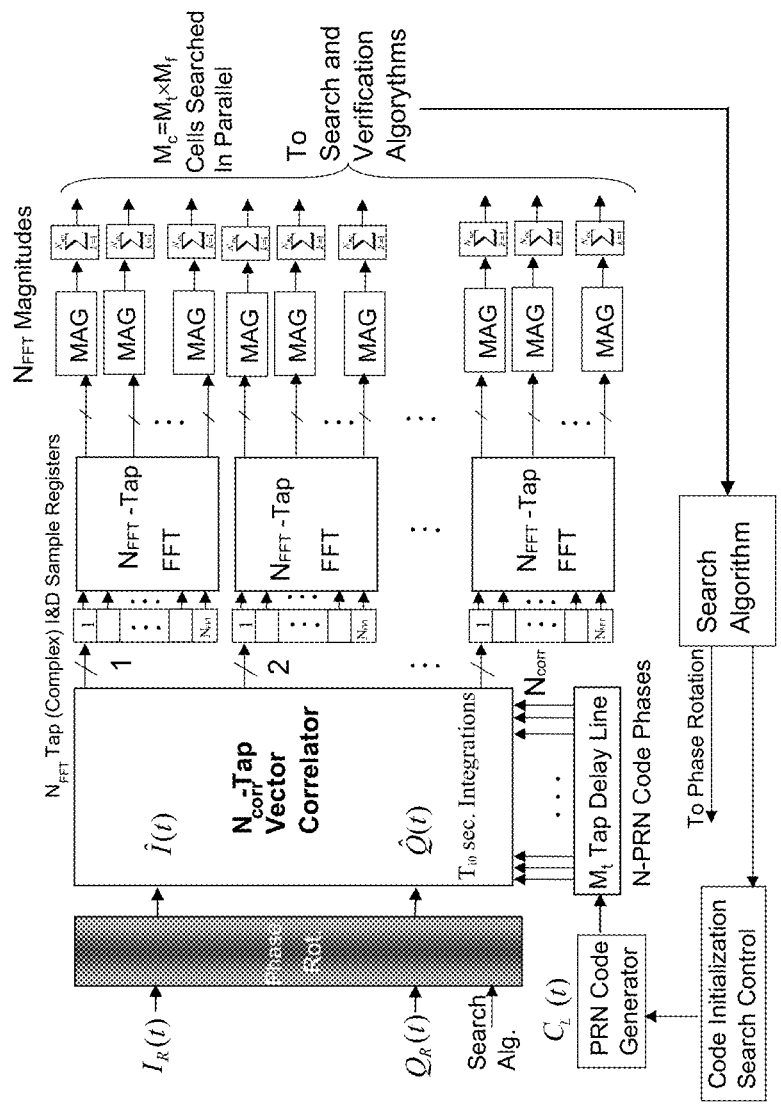
FIG. 13 is a block diagram illustrating an active parallel correlator search receiver processing implementation, according to an embodiment of the present invention.

FIG. 13 is a block diagram illustrating an active parallel correlator search receiver processing implementation 1300, according to an embodiment of the present invention. In FIG. 13, an $N^0_{FFT}$ point FFT is first used to coherently integrate (sum) results of the short integrations up to $T_i$, $$T_i = N^0_{FFT} T_{i0} \quad \text{Equation (6)}$$

The frequency quantization loss in the first short integration is therefore related to the region searched in parallel by the FFT, $\Delta f_{FFT}$, according to $$L_{FQ} = \cdot \frac{1}{Sinc^2\left(\frac{\Delta f_{FFT}}{2} T_{i0}\right)} = \frac{1}{\left[\frac{\sin(\pi \Delta f_{FFT} T_{i0}/2)}{(\pi \Delta f_{FFT} T_{i0}/2)}\right]^2} \quad \text{Equation (7)}$$

for the case of a parallel search over the region $\Delta f_{FFT}$ (this loss is may be called the FFT outer bin loss). If there were no outer bin loss, then the To limit the outer bin loss predicted by Equation (7) to, for example, 0.91 dB, $\Delta f_{FFT}$ is selected so that $$\Delta f_{FFT} = \frac{1}{2T_{i0}} \Rightarrow (L_{FQ})_{db} = 0.91 \text{ dB} \quad \text{Equation (8)}$$

In other words, the total region spanned by the FFT is equal to the ½ the sample rate into the FFT, which is equal to the integrate and dump rate, or just $$F_s^{FFT} = \frac{1}{T_{i0}} \qquad \text{Equation (9)}$$

Thus, in order to maintain frequency quantization losses (due to frequency quantization in regions of width $\Delta f_{FFT}$) to 0.91 dB, Equations (6), (8), and (9) imply that only one-half of the FFT bins are tested for signal, or $\alpha=\frac{1}{2}$. If, for example, the outer FFT bins were tested for signal, they would suffer a loss could be tested for signal, the loss given by substituting $$\Delta f_{FFT} = \frac{1}{T_{io}}$$

into Equation (8), resulting in $$L_{FQ} = \frac{1}{Sinc^2\left(\frac{\Delta f_{FFT}}{2}T_{io}\right)} = \frac{1}{Sinc^2\left(\frac{1}{2}\right)} \Rightarrow (L_{FQ})_{dB} = 3.92 \text{ dB} \qquad \text{Equation (10)}$$

While we are only testing the center half for signal, the fine-level quantization (for the parallel search using an FFT without zero padding) is simply given by the ratio the FFT sampling rate to the number of points in the FFT by $$\delta f_0 = \frac{F_s^{FFT}}{N_{FFT}^0} \qquad \text{Equation (11)}$$

where $\delta f_0$ is also equal to the FFT bin separation under. Substituting Equation (6) for $N^0{}_{FFT}$ and Equation (8) for $F_s^{FFT}$ into Equation (11) leads to the following result for the search bin size $$\delta f_0 = \frac{1}{N_{FFT}^0 T_{io}} = \frac{1}{T_i} \qquad \text{Equation (12)}$$

which is the resolution required to maintain 0.91 dB of frequency quantization loss for an FFT implementation without zero padding.

And the region searched in parallel is given by $$\Delta f_{FFT} = \frac{F_s^{FFT}}{2} = \alpha F_s^{FFT} \qquad \text{Equation (13)}$$

A similar loss occurs in the FFT integration (leading to Equation (6)). This FFT-specific loss, denoted by the FFT-bin loss, is due to the FFT minimum response, which occurs at the midpoint between two bins.

Thus, in some embodiments, the FFT is zero padded resulting in a higher frequency resolution of $$\delta f = \frac{1}{N_{FFT}T_{io}} = \frac{1}{2T_i} \qquad \text{Equation (14)}$$

and the region spanned by the FFT is by $$\Delta f_{FFT} = \frac{F_s^{FFT}}{4} = \alpha \frac{F_s^{FFT}}{2} \qquad \text{Equation (15)}$$

where $\alpha=0.5$ was selected to maintain outer bin losses to 0.91 dB. In other embodiments, $\alpha$ may be selected to trade the number of frequency hypotheses searched in a parallel with overall implementation loss of the acquisition circuit. Note that the magnitude outputs of the FFTs shown in FIG. 13 are accumulated noncoherently (sum of magnitude squared) $N_{NC}$ times resulting in an overall dwell period of $\tau_d = N_{nc} \cdot T_i$. In the case of BOC signal acquisition, one acquisition circuit may be applied to the to the $\hat{I}$ and $\hat{Q}$ components of the USB of a narrow band BOC signal and a second acquisition circuit may be applied to the to the $\hat{I}$ and $\hat{Q}$ components of the LSB of a narrow band BOC signal. In such an application, the resulting magnitudes (each representing a time-frequency hypothesis) may be noncoherently combined to improve performance of the acquisition circuit. Alternatively, only the $\hat{I}$ and $\hat{Q}$ components of the USB may be processed, whilst the LSB signal components are discarded. Alternatively, only the $\hat{I}$ and $\hat{Q}$ components of the LSB may be processed, whilst the USB signal components are discarded. In some embodiments, the parallel operations performed by the acquisition circuit are time shared by operating the acquisition circuit at a clock rate that is much faster than the incoming sample rate ($1/T_{i0}$). It will be readily understood that the components of various embodiments of the present invention, as generally described and illustrated in the figures herein, may be arranged and designed in a wide variety of different configurations. Thus, the detailed description of the embodiments, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A narrowband anti-jam signaling system configured to operate on narrow band navigation signals, comprising:
    an antijam (AJ) signal processing unit configured to suppress a jammer power down to a predetermined level of the narrowband AJ signaling system; and
    a narrowband signal receiver configured to process a narrowband navigation signal, wherein
    the AJ signal processing unit comprises a dual channel wide dynamic range radio frequency (RF) front end and automatic gain control (AGC) configured to amplify incoming RF signals and filter unwanted RF signals prior to digitization,
    the dual channel wide dynamic range RF front end and AGC comprising
        a low noise amplifier and an AGC configured to receive a narrowband binary offset carrier (BOC) signal, and
    a pair of dual quadrature channels configured to down convert spreading codes at an upper sideband (USB) frequency of 10.23 MHz above a carrier, and down convert spreading codes at lower sideband (LSB) frequency of 10.23 MHz below the carrier, to baseband (I/Q) or near zero.

2. The system of claim 1, wherein the predetermined level is determined by a thermal noise floor of the narrowband digital signal receiver.

3. The system of claim 1, wherein the AJ signal processing unit comprises
    a plurality of ADC channels comprising of
    at least one channel configured to provide high precision digitization of a narrowband signal followed by a narrowband signal receiver, and
    at least one channel configured to provide low precision analog to digital conversion followed by a wideband signal receiver.

4. The system of claim 1, wherein the AJ signal processing unit comprises a digital-to-analog converter (DAC) configured to convert one or more digitally processed signals from the AJ processor to an analog domain.

5. The system of claim 4, wherein the DAC is a single channel DAC configured to convert digitally AJ processed signals to an intermediate frequency or a multi-channel DAC or a plurality of DACs configured to convert the digitally processed I and Q channel signals to I and Q channel baseband frequencies.

6. The system of claim 1, wherein the AJ signal processing unit comprises a RF upconverter configured to upconvert processed digital signals from an IF frequency or from baseband I and Q channels.

7. The system of claim 1, wherein the narrowband signal receiver comprises an analog-to-digital converter (ADC) configured to digitize an IF signal or I and Q signals at basebands, wherein
    the ADC is a high precision ADC operating at or greater than 18 bits or a low precision ADC operating at less than 14 bits.

8. The system of claim 1, wherein the narrowband signal digital receiver comprises a digital receiver signal processor configured to
    acquire a narrowband signal, perform code and carrier tracking, and demodulate data from the signal, or
    convert bit resolution from high precision to low precision reducing power consumption in the narrowband digital receiver signal processor.

9. The system of claim 1, wherein the narrowband digital signal receiver is further configured to convert a sample resolution of the processed samples to low precision samples.

10. A narrowband antijam (AJ) signaling system, comprising:
    an AJ signal processing unit comprises a dual channel wide dynamic range radio frequency (RF) front end and automatic gain control (AGC) configured to amplify incoming RF signals and filter unwanted RF signals prior to digitization,
    the dual channel wide dynamic range RF front end and AGC comprising
        a low noise amplifier and an AGC configured to receive a narrowband binary offset carrier (BOC) signal, and
    a pair of dual quadrature channels configured to down convert spreading codes at an upper sideband (USB) frequency of 10.23 MHz above a carrier, and down convert spreading codes at lower sideband (LSB) frequency of 10.23 MHz below the carrier, to baseband (I/Q) or near zero; and
    an AJ processor configured to suppress a jammer power down to a level of a noise floor of the narrowband AJ signaling system, wherein
    the AJ processor is placed between a high precision analog-to-digital (ADC) converter and a narrowband digital receiver, or
    the AJ processor is placed between the high precision ADC and a digital-to-analog converter (DAC).

11. The system of claim 10, wherein the narrowband digital receiver comprises
    an acquisition circuit configured to process received signals by time sharing physical multiply and accumulate operations to select an optimal coherent integration period for a given Jammer to Signal power ratio.

12. The system of claim 11, wherein the selection of the optimal coherent integration period is based on minimization of an acquisition time.

13. A system, comprising:
    a dual channel wide dynamic range radio frequency (RF) frond front end and automatic gain control (AGC) unit that receives a narrowband binary offset carrier (BOC) signal, wherein
    the dual channel wide dynamic range RF front end and AGC comprises a low noise amplifier, an AGC, a first quadrature downconverter (QDC), and a second QDC,
    the low noise amplifier and the AGC are configured to receive the BOC signal,
    the first QDC is configured to downconvert one or more spreading codes at an upper sideband (USB) above the carrier frequency of the BOC signal transmission, and the second QDC is configured to downconvert one or more spreading codes at a lower sideband (LSB) below said carrier frequency.

14. The system of claim 13, wherein separate quadrature downconversion stages are used to downconvert the BOC signal out of the AGC to baseband I and Q components of a USB signal component and to a baseband I and Q components of a LSB signal component.

15. The system of claim 14, further comprising:
a first low pass anti-aliasing filter and a second low pass anti-aliasing filter, each of which is placed prior to digitization by a first dual channel high precision analog-to-digital converter (ADC) and a second dual channel high precision ADC, both of which have 18 or more bits.

16. The system of claim 14, further comprising:
a first pair of single channel analog-to-digital converter (ADCs) configured to digitize the I and Q components of the USB; and
a second pair of single high-precision ADCs configured to digitize the I and Q components of the LSB.

17. The system of claim 14, further comprising:
a first antijam (AJ) signal processor configured to receive the I and Q signal components for the USB and a second AJ signal processor configured to receive the I and Q signal components for the LSB, both of which are configured to reduce an effect of the jammer resulting in a low [J/S] Jammer to Signal ratio.

18. A method, comprising:
digitizing a narrowband satellite signal at a sample rate of $F_S$ samples per second;
obtaining an estimate of a signal-to-noise power spectral density;
selecting an optimal coherent integration time, wherein the optimal coherent integration time is configured to minimize a Time to First Acquisition (TTFA) or a dwell period;
processing one or more digitized signal at a clock rate that is $N \cdot F_S$ cycles per second to perform N operations every sample of an analog-to-digital (ADC) clock rate, wherein the processing of the one or more digitized signal is performed by a parallel correlator or a passive matched filter acquisition circuit; and
selecting a correct time and frequency hypothesis, wherein the correct time and frequency hypothesis is configured to acquire a signal timing and frequency based on an optimized coherent integration period.

19. The method of claim 18, wherein the operations include a plurality of multiply and accumulate operations that are performed at a rate that is faster than the incoming sample rate.

20. The method of claim 19, wherein the multiply and accumulate operations further include performing a FFT Fast Fourier Transform or a DFT Discrete Fourier Transform.

* * * * *